US012795722B2

(12) United States Patent
Ko et al.

(10) Patent No.: US 12,795,722 B2
(45) Date of Patent: Nov. 10, 2026

(54) METHOD AND DEVICE FOR COMMUNICATING ON BASIS OF INTER-UE COORDINATION INFORMATION IN NR V2X

(71) Applicant: LG Electronics Inc., Seoul (KR)

(72) Inventors: Woosuk Ko, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 18/685,977

(22) PCT Filed: Oct. 7, 2022

(86) PCT No.: PCT/KR2022/015220

§ 371 (c)(1),
(2) Date: Feb. 23, 2024

(87) PCT Pub. No.: WO2023/063668

PCT Pub. Date: Apr. 20, 2023

(65) Prior Publication Data

US 2024/0365350 A1 Oct. 31, 2024

Related U.S. Application Data

(60) Provisional application No. 63/254,483, filed on Oct. 11, 2021.

(51) Int. Cl.

| | |
|---|---|
| ***H04W 74/0808*** | (2024.01) |
| ***H04W 52/02*** | (2009.01) |
| ***H04W 72/02*** | (2009.01) |
| ***H04W 72/20*** | (2023.01) |
| ***H04W 72/40*** | (2023.01) |

(Continued)

(52) U.S. Cl.
CPC ... *H04W 74/0808* (2013.01); *H04W 52/0212* (2013.01); *H04W 72/02* (2013.01);
(Continued)

(58) Field of Classification Search
CPC ... H04W 72/02; H04W 72/25; H04W 72/566; Y02D 30/70
See application file for complete search history.

(56) References Cited

U.S. PATENT DOCUMENTS

| | | | |
|---|---|---|---|
| 2021/0250772 | A1 | 8/2021 | Farag |
| 2022/0346114 | A1 | 10/2022 | Aktas et al. |
| 2022/0369345 | A1 | 11/2022 | Aktas et al. |

FOREIGN PATENT DOCUMENTS

| | | |
|---|---|---|
| WO | WO 2021/207459 | 10/2021 |
| WO | WO 2022/080914 | 4/2022 |

(Continued)

OTHER PUBLICATIONS

Office Action in U.S. Appl. No. 17/963,866, mailed on Mar. 3, 2023, 9 pages.

(Continued)

*Primary Examiner* — Mahran Y Abu Roumi
(74) *Attorney, Agent, or Firm* — Fish & Richardson P.C.

(57) ABSTRACT

A method by which a first device performs wireless communication and a device for supporting same are provided. The method may comprise the steps of: acquiring a configuration for partial sensing-based resource selection, the partial sensing including periodic-based partial sensing (PBPS) or contiguous partial sensing (CPS); receiving, from a second device, inter-UE coordination (IUC) information including information related to a preferred resource set; acquiring sidelink (SL) data; and selecting, on the basis that the partial sensing is skipped for power saving, a transmission resource for the SL data from among resources belonging to the preferred resource set included in the IUC information.

11 Claims, 20 Drawing Sheets

(51) Int. Cl.
*H04W 74/00* (2009.01)
*H04W 76/28* (2018.01)

(52) U.S. Cl.
CPC .......... *H04W 72/20* (2023.01); *H04W 72/40* (2023.01); *H04W 74/002* (2013.01); *H04W 76/28* (2018.02)

(56) References Cited

FOREIGN PATENT DOCUMENTS

| | | | | |
|---|---|---|---|---|
| WO | WO 2022/087111 | | 4/2022 | |
| WO | WO 2022/241357 | | 11/2022 | |
| WO | WO-2022240868 A1 | * | 11/2022 | H04W 72/02 |

OTHER PUBLICATIONS

Franuhofer HHI, Fraunhofer IIS, "Resource Allocation Enhancements for Mode 2," 3GPP TSG RAN WG1, Meeting #106bis-e, R1-2109431, e-Meeting, Oct. 11-19, 2021, 23 pages.

Huawei, HiSilicon, "Sideline resource allocation to reduce power consumption," 3GPP TSG RAN WG1, Meeting #106bis-e, R1-2108763, e-Meeting, Oct. 11-19, 2021, 29 pages.

Intel Corporation, "Sideline Resource Allocation Schemes for UE Power Saving," 3GPP TSG RAN WG1, Meeting #106-e, R1-2107609, e-Meeting, Aug. 16-27, 2021, 16 pages.

International Search Report and Written Opinion in International Appln. No. PCT/KR2022/015220, mailed on Jan. 16, 2023, 17 pages (with English translation).

Nokia, Nokia Shanghai Bell, "Inter-UE coordination for Mode 2 enhancements," 3GPP TSG RAN WG1, Meeting #106bis-e, R1-2108819, e-Meeting, Oct. 11-19, 2021, 27 pages.

Extended European Search Report in European Appln. No. 22881296.2, mailed on Oct. 22, 2024, 11 pages.

LG Electronics, "Discussion on resource allocation for power saving," R1-2100517, 3GPP TSG RAN WG1, Meeting #104-e, e-Meeting, Jan. 25-Feb. 5, 2021, 20 pages.

LG Electronics, "Discussion on resource allocation for power saving," R1-2103378, 3GPP TSG RAN WG1, Meeting #104bis-e, e-Meeting, Apr. 12-20, 2021, 21 pages.

* cited by examiner

METHOD AND DEVICE FOR COMMUNICATING ON BASIS OF INTER-UE COORDINATION INFORMATION IN NR V2X

CROSS-REFERENCE TO RELATED APPLICATIONS

This application is a National Stage application under 35 U.S.C. § 371 of International Application No. PCT/KR2022/015220, filed on Oct. 7, 2022, which claims the benefit of U.S. Provisional Application No. 63/254,483, filed on Oct. 11, 2021. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, according to the prior art, when selecting a method of allocating resource(s), the UE does not use inter-UE coordination information. For this reason, when the UE selects/allocates resource(s) based on partial sensing or the like, a problem in which resource collisions cannot be effectively avoided may occur.

In one embodiment, provided is a method for performing wireless communication based on partial sensing by a first device. The method may comprise: obtaining a configuration for resource selection based on partial sensing, wherein the partial sensing includes periodic-based partial sensing (PBPS) or contiguous partial sensing (CPS); receiving, from a second device, inter-UE coordination (IUC) information including information related to a preferred resource set; obtaining sidelink (SL) data; and selecting a transmission resource for the SL data from resources belonging to the preferred resource set included in the IUC information, based on skipping the partial sensing for power saving.

In one embodiment, provided is a first device adapted to perform wireless communication. The first device may comprise: one or more memories storing instructions; one or more transceivers; and one or more processors connected to the one or more memories and the one or more transceivers, wherein the one or more processors execute the instructions to: obtain a configuration for resource selection based on partial sensing, wherein the partial sensing includes periodic-based partial sensing (PBPS) or contiguous partial sensing (CPS); control the one or more transceivers to receive, from a second device, inter-UE coordination (IUC) information including information related to a preferred resource set; obtain sidelink (SL) data; and select a transmission resource for the SL data from resources belonging to the preferred resource set included in the IUC information, based on skipping the partial sensing for power saving.

In one embodiment, provided is a processing device adapted to control a first device. The processing device may comprise: one or more processors; and one or more memories operably connected to the one or more processors and storing instructions, wherein the one or more processors execute the instructions to: obtain a configuration for resource selection based on partial sensing, wherein the partial sensing includes periodic-based partial sensing (PBPS) or contiguous partial sensing (CPS): receive, from a second device, inter-UE coordination (IUC) information including information related to a preferred resource set; obtain sidelink (SL) data; and select a transmission resource for the SL data from resources belonging to the preferred resource set included in the IUC information, based on skipping the partial sensing for power saving.

The power saving gain of the UE can be maximized and the reliability of SL communication can be secured.

DETAILED DESCRIPTION

Figure 1:
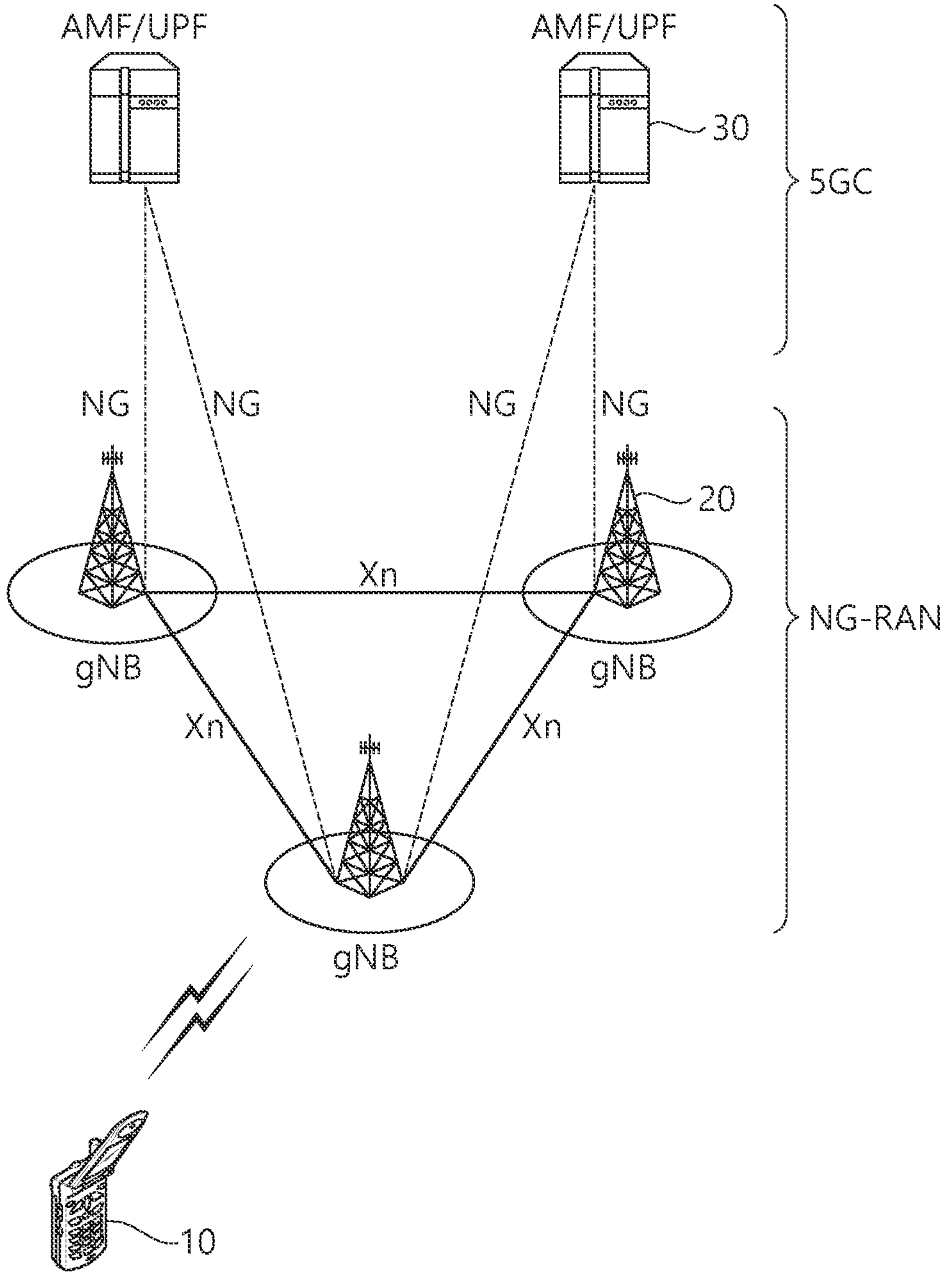
FIG. 1 shows a structure of an NR system, based on an embodiment of the present disclosure.

In the present disclosure, “A or B” may mean “only A”, “only B” or “both A and B.” In other words, in the present disclosure, “A or B” may be interpreted as “A and/or B”. For example, in the present disclosure, “A, B, or C” may mean “only A”, “only B”, “only C”, or “any combination of A, B, C”.

A slash (/) or comma used in the present disclosure may mean “and/or”. For example, “A/B” may mean “A and/or B”. Accordingly, “A/B” may mean “only A”, “only B”, or “both A and B”. For example, “A, B. C” may mean “A, B, or C”.

In the present disclosure. “at least one of A and B” may mean “only A”, “only B”, or “both A and B”. In addition, in the present disclosure, the expression “at least one of A or B” or “at least one of A and/or B” may be interpreted as “at least one of A and B”.

In addition, in the present disclosure, “at least one of A, B, and C” may mean “only A”, “only B”, “only C”, or “any combination of A, B, and C”. In addition, “at least one of A, B, or C” or “at least one of A, B, and/or C” may mean “at least one of A, B, and C”.

In addition, a parenthesis used in the present disclosure may mean “for example”. Specifically, when indicated as “control information (PDCCH)”, it may mean that “PDCCH” is proposed as an example of the “control information”. In other words, the “control information” of the present disclosure is not limited to “PDCCH”, and “PDCCH” may be proposed as an example of the “control information”. In addition, when indicated as “control information (i.e., PDCCH)”, it may also mean that “PDCCH” is proposed as an example of the “control information”.

In the following description, ‘when, if, or in case of’ may be replaced with ‘based on’.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
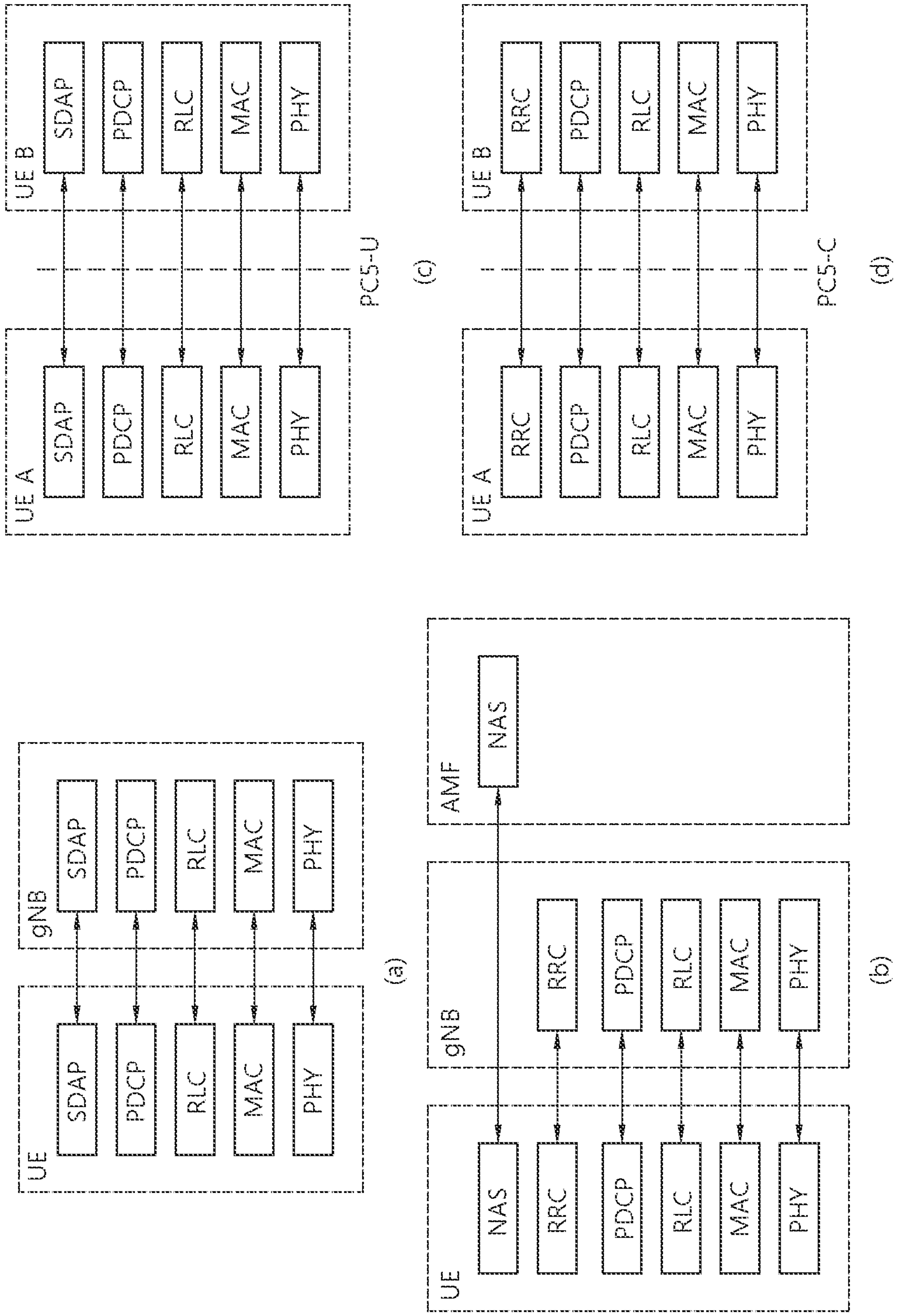
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
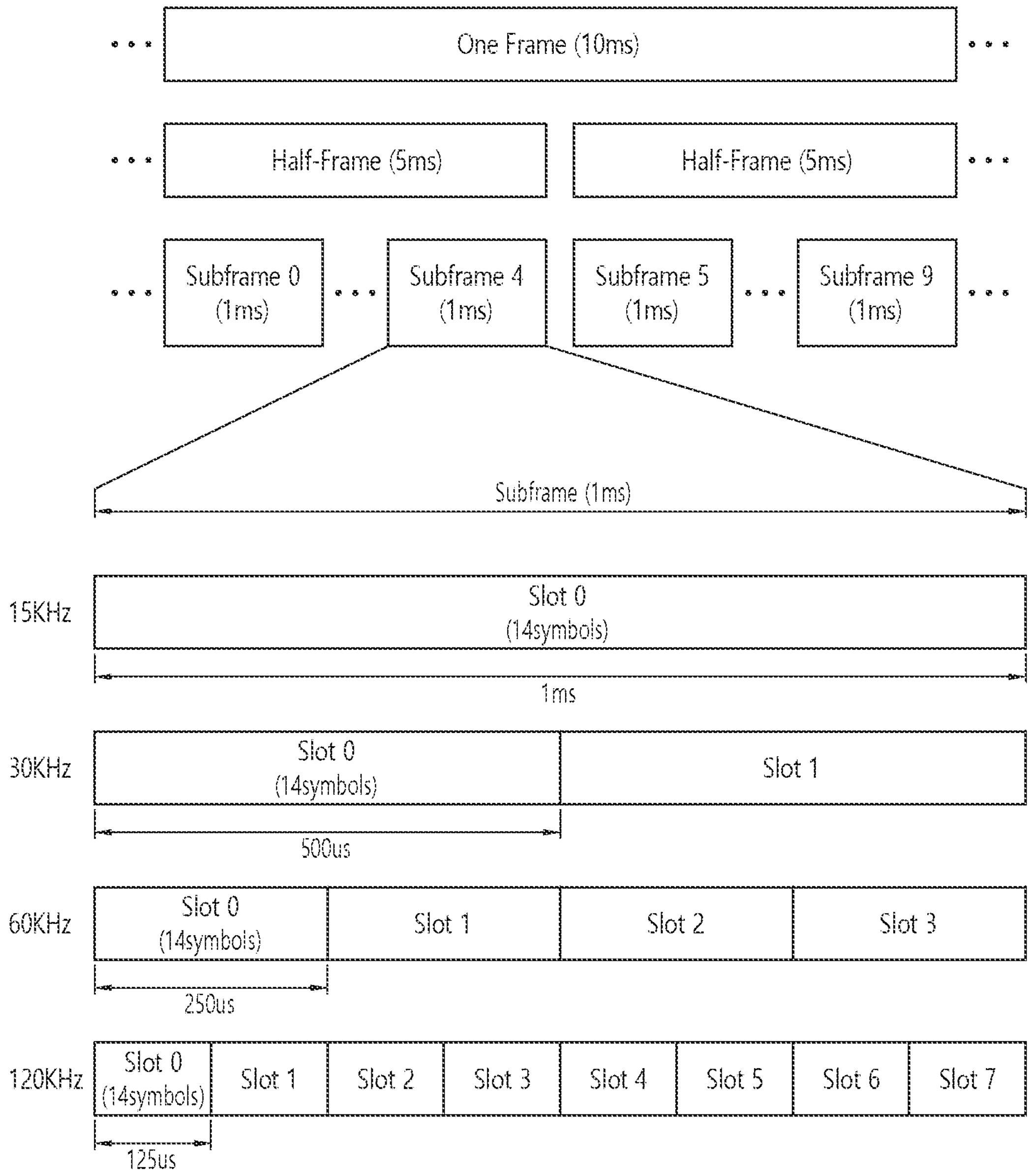
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,\mu}_{slot}$), and a number of slots per subframe ($N^{subframe,\mu}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDMA(A) numerologies (e.g., length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system. FR1 may mean a “sub 6 GHz range”, and FR2 may mean an “above 6 GHz range” and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz. and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
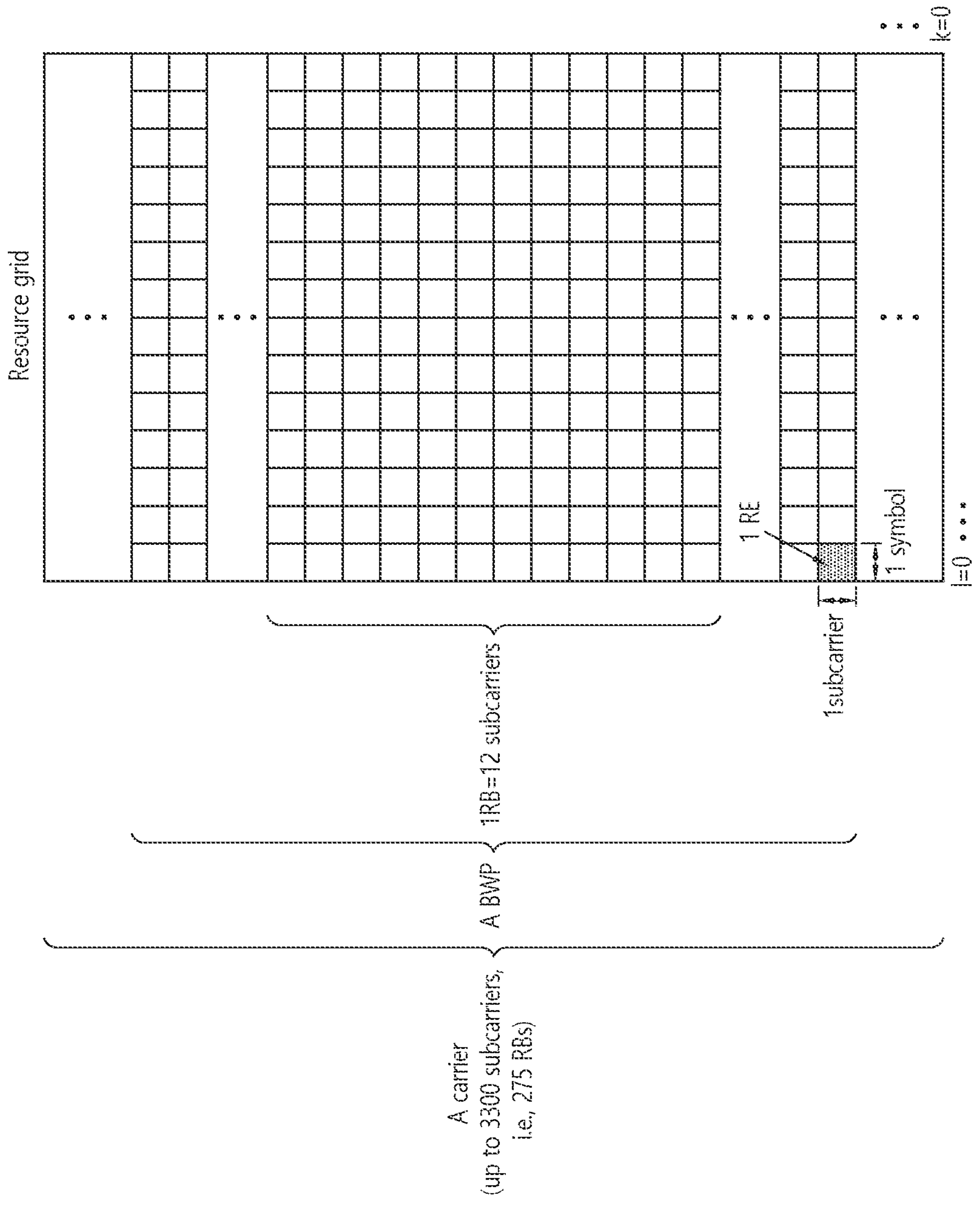
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
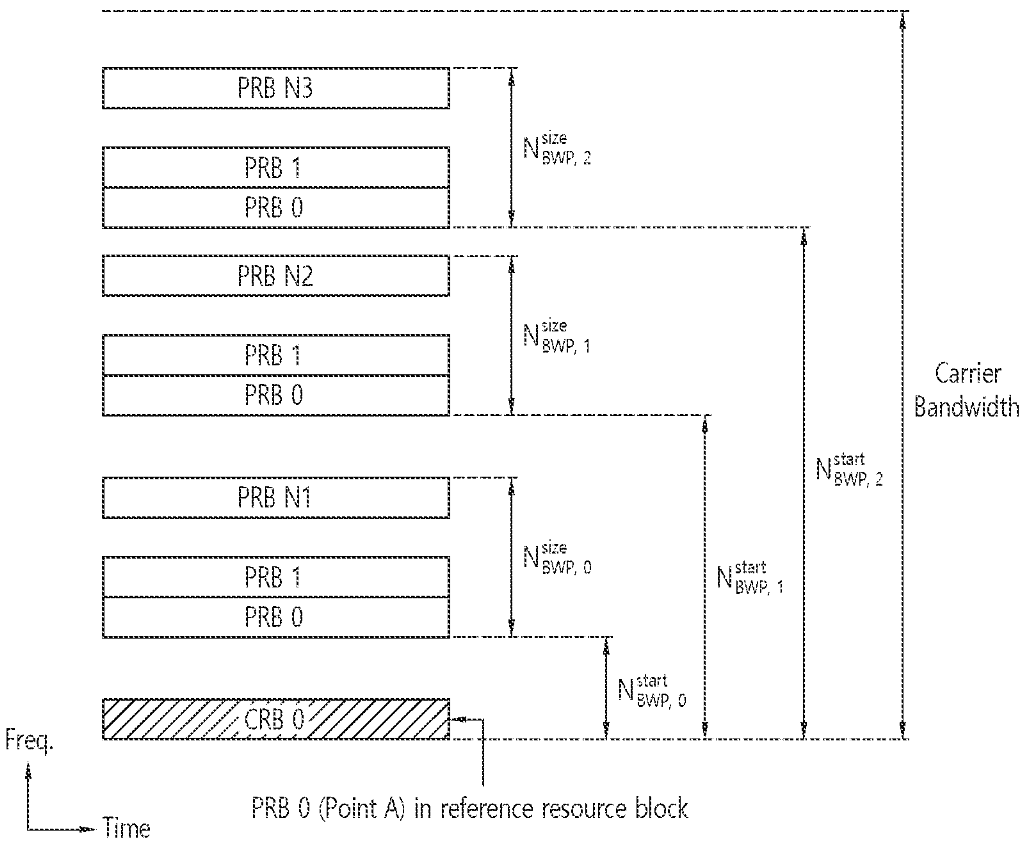
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
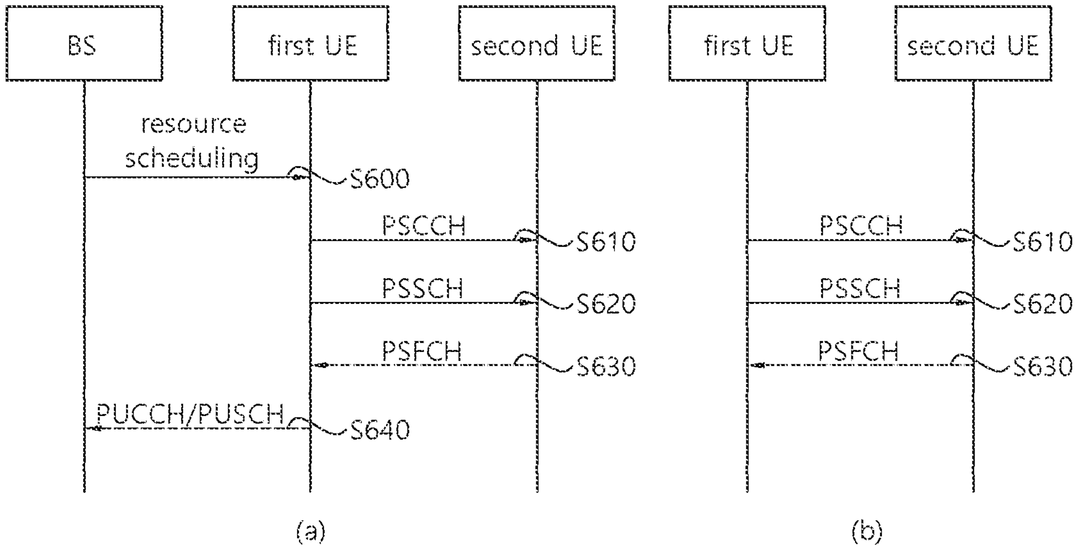
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—ceiling ($\log_2$ I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits

New data indicator—1 bit

Lowest index of the subchannel allocation to the initial transmission—ceiling ($\log_2$(NSLubaCamne)) bits SCI format 1-A fields: frequency resource assignment, time resource assignment PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH.

PUCCH resource indicator—3 bits

Configuration index—0 bit if the UE is not configured to monitor DCI format 3_0 with CRC scrambled by SL-CS-RNTI: otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling ($\log_2(N^{SL}_{subChannel}+1)/2)$) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured: 0 bit otherwise DMRS pattern—ceiling ($\log_2 N_{pattern}$) bits, where $N_{pattern}$ is the number of DMRS patterns configured by higher layer parameter sl-PSSCH-DMRS-TimePattemList $2^{nd}$-stage SCI format—2 bits as defined in Table 5

Beta_offset indicator—2 bits as provided by higher layer parameter sl-BetaOffsets2ndSCi Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CST request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
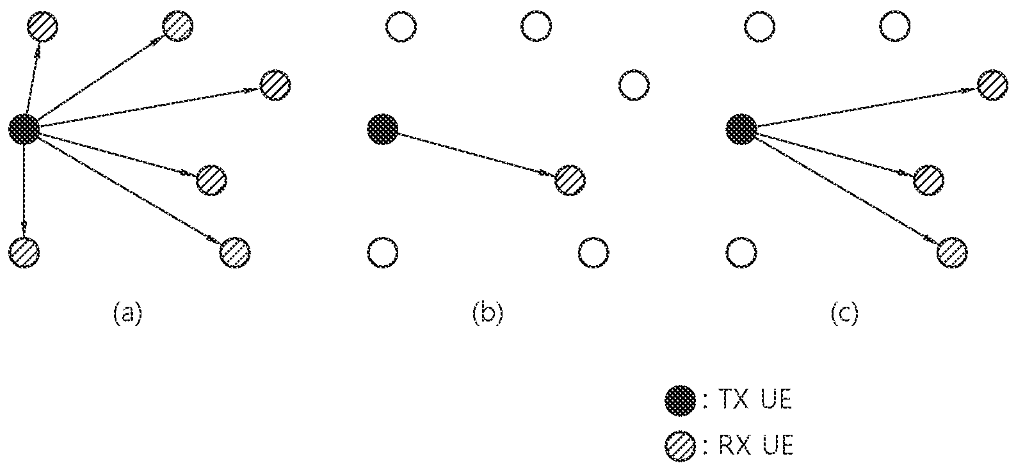
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK. ACK information, or positive-ACK information, and HARQ-NACK may be referred to as NACK, NACK information, or negative-ACK information.

Hereinafter, UE procedure for reporting HARQ-ACK on sidelink will be described.

A UE can be indicated by an SC format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ ($0 \leq k < T_{max}$) has a PSFCH transmission occasion resource if k mod $N^{PSFCH}_{PSSCH}=0$, where $t'^{SL}_k$ is a slot that belongs to the resource pool, $T_{max}$ is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i+j\cdot N^{PSFCH}_{PSSCH})\cdot M^{PSFCH}_{subch,set}, (i+1+j\cdot N^{PSFCH}_{PSSCH})\cdot M^{PSFCH}_{subch,slot}-1]$ PRBs from the $M_{PRB,set}{}^{PSFCH}$ PRBs to slot i among the PSSCH slots associated with the PSFCH slot and sub-channel j, where $M^{PSFCH}_{subch,slot}=M^{PSFCH}_{PRB,set}/(N_{subch}\cdot N^{PSFCH}_{PSSCH})$, $0\le i<N^{PSFCH}_{PSSCH}$, $0\le j<N_{subch}$, and the allocation starts in an ascending order of i and continues in an ascending order of j. The UE expects that $M^{PSFCH}_{PRB,set}$ is a multiple of $N_{subch}\cdot N^{PSFCH}_{PSSCH}$.

A UE determines a number of PSFCH resources available for multiplexing HARQ-ACK information in a PSFCH transmission as $R^{PSFCH}_{PRB,CS}=N^{PSFCH}_{type}\cdot M^{PSFCH}_{subch,slot}\cdot N^{PSFCH}_{CS}$ where $N^{PSFCH}_{CS}$ is a number of cyclic shift pairs for the resource pool and, based on an indication by higher layers,

- $N^{PSFCH}_{type}=1$ and the $M^{PSFCH}_{subch,set}$ PRBs are associated with the starting sub-channel of the corresponding PSSCH
- $N^{PSFCH}_{type}=N^{PSSCH}_{subch}$ and the $N^{PSSCH}_{subch}\cdot M^{PSFCH}_{subch,set}$ PRBs are associated with one or more sub-channels from the $N^{PSSCH}_{subch}$ sub-channels of the corresponding PSSCH The PSFCH resources are first indexed according to an ascending order of the PRB index, from the $N^{PSFCH}_{type}\cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID}) \bmod R^{PSFCH}_{PRB,CS}$ where $P_{ID}$ is a physical layer source ID provided by SC format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift α, from a cyclic shift pair index corresponding to a PSFCH resource index and from $N^{PSFCH}_{CS}$ using Table 8.

TABLE 8

| | $m_0$ | | | | | |
|---|---|---|---|---|---|---|
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Hereinafter, UE procedure for determining the subset of resources to be reported to higher layers in PSSCH resource selection in sidelink resource allocation mode 2 will be described.

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

- the resource pool from which the resources are to be reported;
- L1 priority, $prio_{TX}$;
- the remaining packet delay budget;
- the number of sub-channels to be used for the PSSCH/PSCCH transmission in a slot, $L_{subCH}$,
- optionally, the resource reservation interval, $P_{rsvp\_TX}$, in units of msec.
- if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r'_0, r'_1, r'_2, \ldots)$ which may be subject to pre-emption.
- it is up to UE implementation to determine the subset of resources as requested by higher layers before or after the slot $r_1''-T_3$ where $r_1''$ is the slot with the smallest slot index among ($r_0$, $r_1$, $r_2$, . . . ) and ($r'_0$, $r'_1$, $r'_2$, . . . ), and $T_3$ is equal to $T^{SL}_{proc,1}$, where $T^{SL}_{proc,1}$ is defined as the number of slots according to SCS, where $\mu_{SL}$ is the SCS configuration of the SL BWP.

The following higher layer parameters affect this procedure:

sl-SelectionWindowList: internal parameter T2 min is set to the corresponding value from higher layer parameter sl-SelectionWindowList for the given value of $prio_{TX}$.

sl-Thres-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j = prio_{TX}$.

sl-RS-ForSensing selects if the UE uses the PSSCH-RSRP or PSCCH-RSRP measurement.

sl-ResourceReservePeriodList sl-SensingWindow: internal parameter $T_0$ is defined as the number of slots corresponding to sl-SensingWindow msec.

sl-TxPercentageList: internal parameter X for a given $prio_{TX}$ is defined as sl-TxPercentageList (priorx) converted from percentage to ratio.

sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $P'_{rsvp\_TX}$.

Notation:

($t'^{SL}_0$, $t'^{SL}_1$, $t'^{SL}_2$, . . . ) denotes the set of slots which belongs to the sidelink resource pool.

For example, the UE may select a set of candidate resources (SA) based on Table 11. For example, if resource (re)selection is triggered, the UE may select a set of candidate resources (SA) based on Table 11. For example, if re-evaluation or pre-emption is triggered, the UE may select a set of candidate resources (SA %) based on Table 11.

TABLE 11

The following steps are used:

1) A candidate single-slot resource for transmission $R_{x,y}$ is defined as a set of $L_{subCH}$ contiguous sub-channels with subchannel x + j in slot $t'^{SL}_y$ where j = 0, . . . , $L_{subCH} - 1$. The UE shall assume that any set of $L_{subCH}$ contiguous subchannels included in the corresponding resource pool within the time interval [n + $T_1$, n + $T_2$] correspond to one candidate single-slot resource, where selection of $T_1$ is up to UE implementation under $0 \le T_1 \le T^{SL}_{proc,1}$, where $T^{SL}_{proc,1}$ is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \le T_2$ remaining packet delay budget (in slots); otherwise $T_2$ is set to the remaining packet delay budget (in slots).

The total number of candidate single-slot resources is denoted by $M_{total}$.

2) The sensing window is defined by the range of slots $[n - T_0, n - T^{SL}_{proc,0})$ where $T_0$ is defined above and $T^{SL}_{proc,0}$ is defined i defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter Th($p_i$, $p_j$) is set to the corresponding value of RSRP threshold indicated by the i-th field in sl-Thres-RSRP-List, where i = $p_i$ + ($p_j$ − 1) * 8.

4) The set $S_A$ is initialized to the set of all the candidate single-slot resources.

5) The UE shall exclude any candidate single-slot resource $R_{x,y}$ from the set $S_A$ if it meets all the following conditions:

the UE has not montiored slot $t'^{SL}_m$ in Step 2.

for any periodicity value allowed by the higher layer parameter sl-ResourceReservePeriodList and a hypothetical format 1-A received in slot $t'^{SL}_m$ with 'Resource reservation period' field set to that periodicity value and indicating all indicating all subchannels of the resource pool in this slot, condition c in step 6 would be met.

5a) If the number of candidate single-slot resources $R_{x,y}$ remaining in the set $S_A$ is smaller than X · $M_{total}$ the set $S_A$ is initialized to the set of all the candidate single-slot resources as in step 4.

6) The UE shall exclude any candidate single-slot resource $R_{x,y}$ from the set $S_A$ if it meets all the following conditions:

a) format 1-A received in slot $t'^{SL}_m$ with 'Resource reservation period' field set to that periodicity value and indicating all field in the received SCI format 1-A indicate the values $P_{rsvp\_RX}$ and $prio_{RX}$, respectively according to Clause 16.4 in [6, TS 38.213];

b) the RSRP measurement performed, according to clause 8.4.2. 1 for the received SCI format 1-A, is higher than Th($prio_{RX}$, $prio_{TX}$);

TABLE 11-continued c) the SCI format received in slot $t'^{SL}_m$ or the same SCI format which, if and only if the 'Resource reservation perio' field, is present in the received SCI format 1-A is assumed to be received in slot(s) $t'^{SL}_{m+q\times P'_{rsvp\_RX}}$ determines according to clause 8.1.5 the set of resource blocks and slots which overlaps with $R_{x,y+j\times P'_{rsrp\_TX}}$ for q = 1, 2, … , Q and j = 0, 1, … , $C_{resel} - 1$. Here, $P'_{rsvp\_RX}$ is $P_{rsvp\_RX}$ converted to units of logical slots according to clause 8.1.7, $Q = \left\lceil \frac{T_{scal}}{P_{rsvp\_RX}} \right\rceil$ if $P_{rsvp\_RX} < T_{scal}$ and $n' - m < P'_{rsvp\_RX}$, where $t'^{SL}_{n'} = n$ if slot n belongs to the set $\left(t'^{SL}_0, t'^{SL}_1, \ldots, t'^{SL}_{T'_{max}-1}\right)$, otherwise slot $t'^{SL}_{n'}$ is the first slot after slot n belonging to the set $\left(t'^{SL}_0, t'^{SL}_1, \ldots, t'^{SL}_{T'_{max}-1}\right)$; otherwise Q = 1.

$T_{scal}$ is set to selection window size $T_2$ converted to units of msec.

7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

The UE shall report set $S_A$ to higher layers.

If a resource $r_i$ from the set $(r_0, r_1, r_2, \ldots)$ is not a member of $S_A$, then the UE shall report re-evaluation of the resource $r_i$ to higher layers.

If a resource $r'_i$ from the set $(r'_0, r'_1, r'_2, \ldots)$ meets the conditions below then the UE shall report pre-emption of the resource $r'_i$ to higher layers $r'_i$ is not a member of $S_A$, and $r'_i$ meets the conditions for exclusion in step 6, with $Th(prio_{RX}, prio_{TX})$ set to the final threshold after executing steps 1)-7), i.e. including all necessary increments for reaching $X \cdot M_{total}$, and the associated priority $prio_{RX}$, satisfies one of the following conditions:

sl-PreemptionEnable is provided and is equal to 'enabled' and $prio_{TX} > prio_{RX}$ sl-PreemptionEnable is provided and is not equal to 'enabled', and $prio_{RX} < prio_{pre}$ and $prio_{TX} > prio_{RX}$ Meanwhile, partial sensing may be supported for power saving of the UE. For example, in LTE SL or LTE V2X, the UE may perform partial sensing based on Tables 12 and 13.

TABLE 12

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format I by the UE are all provided by higher layers.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers. Cresel is determined by $C_{resel} = 10$ * SL_RESOURCE_RESELECTION_ COUNTER, where SL_RESOURCE_RESELECTION_COUNTER is provided by higher layers.

. . .

If partial sensing is configured by higher layers then the following steps are used:

1) A candidate single-subframe resource for PSSCH transmission $R_{x,y}$ is defined as a set of $L_{subCH}$ contiguous sub-channels with sub-channel x + j in subframe $t^{SL}_y$ where j = 0, … $L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of subframes correspond to one candidate single-subframe resource. The total number of the candidate single-subframe resources is denoted by $M_{total}$.

2) If a subframe $t^{SL}_y$ is included in the set of subframes in Step 1. the UE shall monitor any subframe $t^{SL}_{y-k\times P_{step}}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i = (a − 1) * 8 + b.

TABLE 12-continued

| |
|---|
| 4) The set $S_A$ is initialized to the union of all the candidate single-subframe resources. The set $S_B$ is initialized to an empty set. |
| 5) The UE shall exclude any candidate single-subframe resource $R_{x,y}$ from the set $S_A$ if it meets all the following conditions: |
| the UE receives an SCI format 1 in subframe $t_m^{SL}$, and "Resource reservation" field and "Priority" field in the received SCI format 1 indicate the values $P_{rsvp\_RX}$ and $prio_{RX}$, respectively. |
| PSSCH-RSRP measurement according to the received SCI format 1 is higher than $Th_{prio_{TX},prio_{RX}}$. |
| the SCI format received in subframe $t_m^{SL}$ or the same SCI format 1 which is assumed to be received in subframe(s) $t^{SL}_{m+q\times P_{step}\times P_{rsvp\_RX}}$ determines according to 14.1.1.4C the set of resource blocks and subframes which overlaps with $R_{x,y+j\times P'_{rsvp\_TX}}$ for q = 1, 2, ... , Q and j = 0, 1, ... , $C_{resel}-1$. Here, $Q=\frac{1}{P_{rsvp\_RX}}$ if $P_{rsvp\_RX}<1$ and $y'-m\le P_{step}\times P_{rsvp\_RX}+P_{step}$, where $t_{y'}^{SL}$ is the last subframe of the Y subframes, and Q = 1 otherwise. |
| 6) If the number of candidate single-subframe resources remaining in the set $S_A$ is smaller than $0.2\cdot M_{total}$, then Step 4 is repeated with $Th_{a,b}$ increased by 3 dB. |

TABLE 13

| |
|---|
| 7) For a candidate single-subframe resource $R_{x,y}$ remaining in the set $S_A$, the metric $E_{x,y}$ is defined as the linear average of S-RSSI measured in sub-channels x + k for k = 0, . . . , $L_{subCH}-1$ in the monitored subframes in Step 2 that can be expressed by $t^{SL}_{y-P_{step}}*j$ for a non-negative integer j. |
| 8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2\cdot M_{total}$. |
| 9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time. |
| The UE shall report set $S_B$ to higher layers. |
| If transmission based on random selection is configured by upper layers and when the UE is configured by upper layers to transmit using resource pools on multiple carriers, the following steps are used: |
| 1) A candidate single-subframe resource for PSSCH transmission $R_{x,y}$ is defined as a set of $L_{subCH}$ contiguous sub-channel with sub-channel x + j in subframe $t_y^{SL}$ where j = 0, ... , $L_{subCH}-1$. The UE shall assume that any set of $L_{subCH}$ contiguous sub-channels included in the corresponding PSSCH resource pool within the time interval [n + $T_1$, n + $T_2$] corresponds to one candidate single-subframe resource, where selections of $T_1$ and $T_2$ are up to UE implementations under $T_1\le 4$ and $T_{2min}(prio_{TX})\le T_2\le 100$, if $T_{2min}(prio_{TX})$ is provided by higher layers for $prio_{TX}$, otherwise $20\le T_2\le 100$ UE selection of $T_2$ shall fulfil the latency requirement. The total number of the candidate single-subframe resources is denoted by $M_{total}$. |
| 2) The set $S_A$, is initialized to the union of all the candidate single-subframe resources. The set $S_B$ is initialized to an empty set. |
| 3) The UE moves the candidate single-subframe resource $R_{x,y}$ from the set $S_A$ to $S_B$. |
| 4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time]. |
| The UE shall report set $S_B$ to higher layers. |

Figure 8:
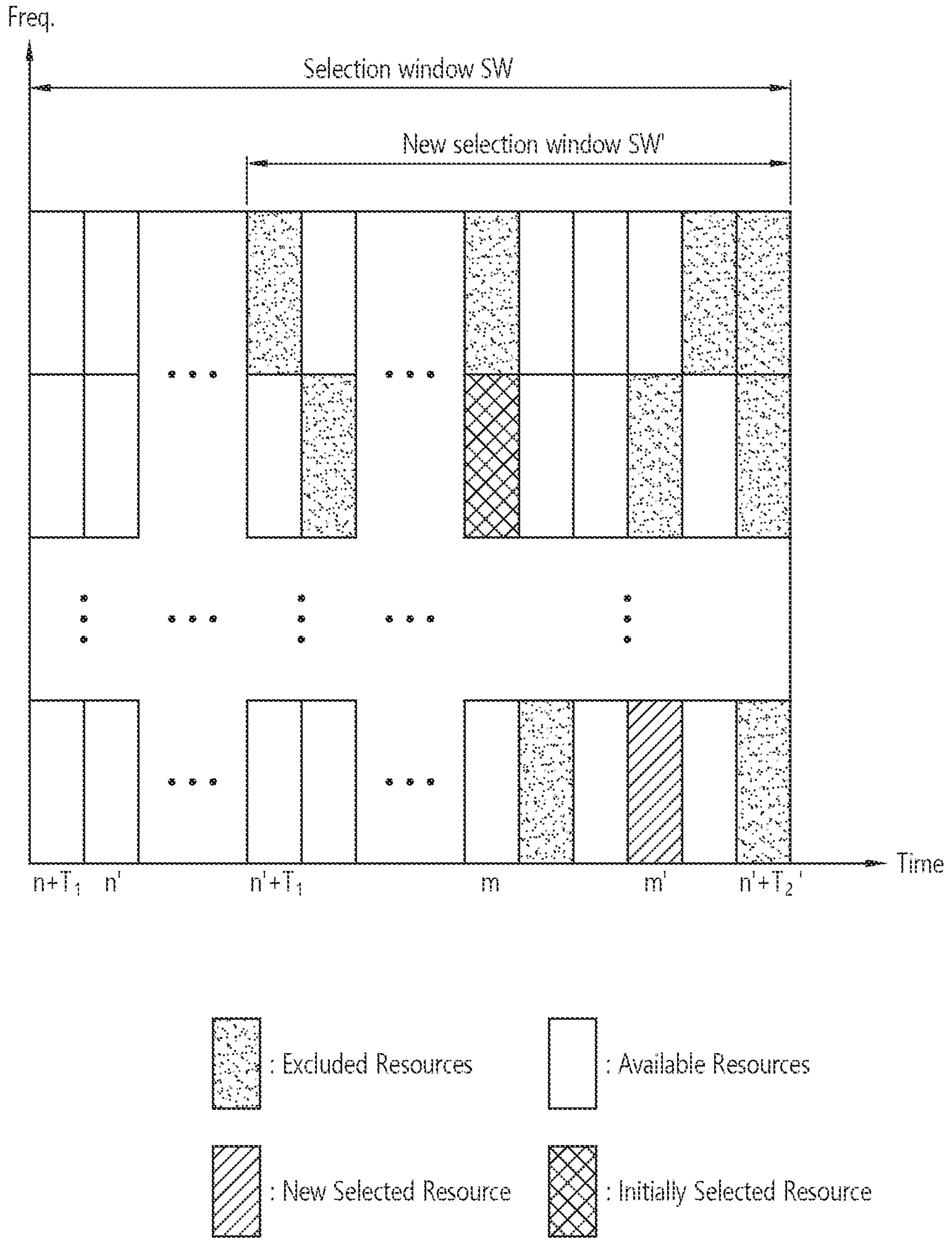
FIG. 8 shows a method for a UE to reselect a resource through a re-evaluation procedure or a pre-emption procedure, based on an embodiment of the present disclosure.

FIG. 8 shows a method for a UE to reselect a resource through a re-evaluation procedure or a pre-emption procedure, based on an embodiment of the present disclosure. The embodiment of FIG. 8 may be combined with various embodiments of the present disclosure.

Referring to FIG. 8, it is assumed that the UE selects a first resource (i.e., initially selected resource) in the slot m within the selection window. In this case, the UE may continuously perform sensing through the re-evaluation procedure or the pre-emption procedure before the first resource is actually used, and the UE may detect a collision for the first resource. In this case, the UE may reselect the first resource in the slot m as a second resource (i.e., new selected resource) in the slot m'. The re-evaluation procedure or the pre-emption procedure is specifically described in Table 11.

Meanwhile, according to the prior art, when selecting a method of allocating resource(s), the UE does not use inter-UE coordination information. For this reason, when the UE selects/allocates resource(s) based on partial sensing or the like, a problem in which resource collisions cannot be effectively avoided may occur.

Based on an embodiment of the present disclosure, a method for selecting a resource allocation method based on coordination information between UEs and an apparatus supporting the same are proposed.

For example, in various embodiments of the present disclosure, periodic-based partial sensing (PPS) may refer to an operation of performing sensing at the time corresponding to an integer multiple k of each period based on the number of periods corresponding to a specific configured value when performing sensing for resource selection. For example, the periods may be periods of transmission resources configured in a resource pool. For example, the UE may sense resource(s) at the time that is earlier in time by an integer multiple k of each period from the time of candidate resource(s) to be determined whether or not a resource collision occurs. For example, the k value may be configured in the form of a bitmap. In the present disclosure, the PPS may be referred to as PBPS.

Figure 9:
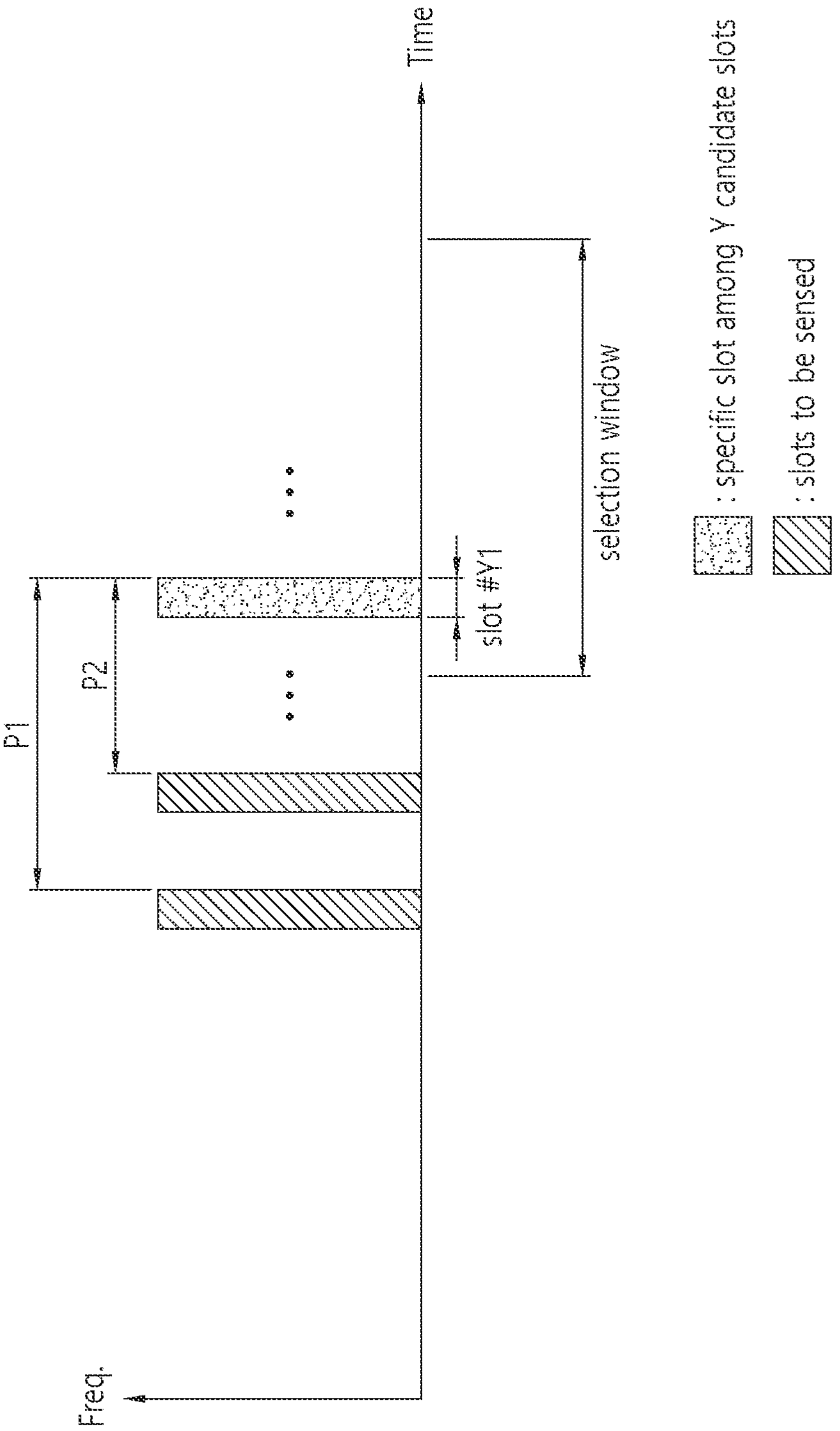
FIG. 9 and FIG. 10 show a method for a UE to perform PBPS, based on an embodiment of the present disclosure.
Figure 10:
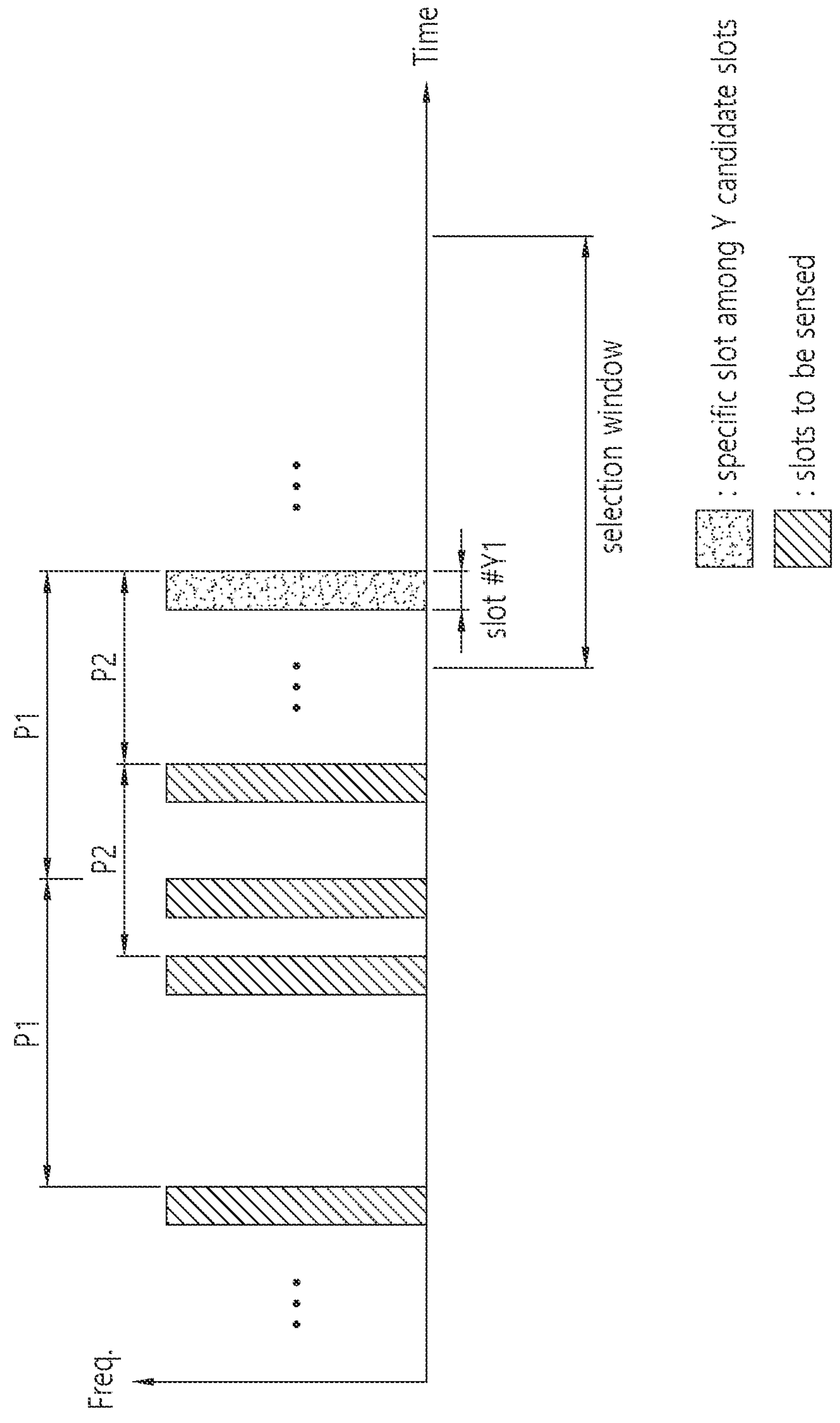

FIG. 9 and FIG. 10 show a method for a UE to perform PBPS, based on an embodiment of the present disclosure. The embodiments of FIG. 9 and FIG. 10 may be combined with various embodiments of the present disclosure.

In the embodiments of FIG. 9 and FIG. 10, it is assumed that resource reservation periods allowed for a resource pool or resource reservation periods configured for PBPS is P1 and P2. Furthermore, it is assumed that the UE performs partial sensing (i.e., PBPS) for selecting a SL resource in the slot #Y1.

Referring to FIG. 9, the UE may perform sensing for a slot located before P1 from the slot #Y1 and a slot located before P2 from the slot #Y1. In the embodiment of FIG. 9, the UE may perform monitoring for the most recent sensing occasion.

Referring to FIG. 10, the UE may perform sensing for a slot located before Pt from the slot #Y1 and a slot located before P2 from the slot #Y1. Furthermore, optionally, the UE may perform sensing for a slot located before 2*P1 from the slot #Y1 and a slot located before 2*P2 from the slot #Y1. In the embodiment of FIG. 10, the UE may perform monitoring for the most recent sensing occasion and the last sensing occasion before the most recent sensing occasion.

For example, in various embodiments of the present disclosure, continuous partial sensing (CPS) may refer to an operation of sensing all or a part of a time domain given as a specific configured value. For example, the CPS may include a short-term sensing operation in which sensing is performed for a relatively short duration.

Figure 11:
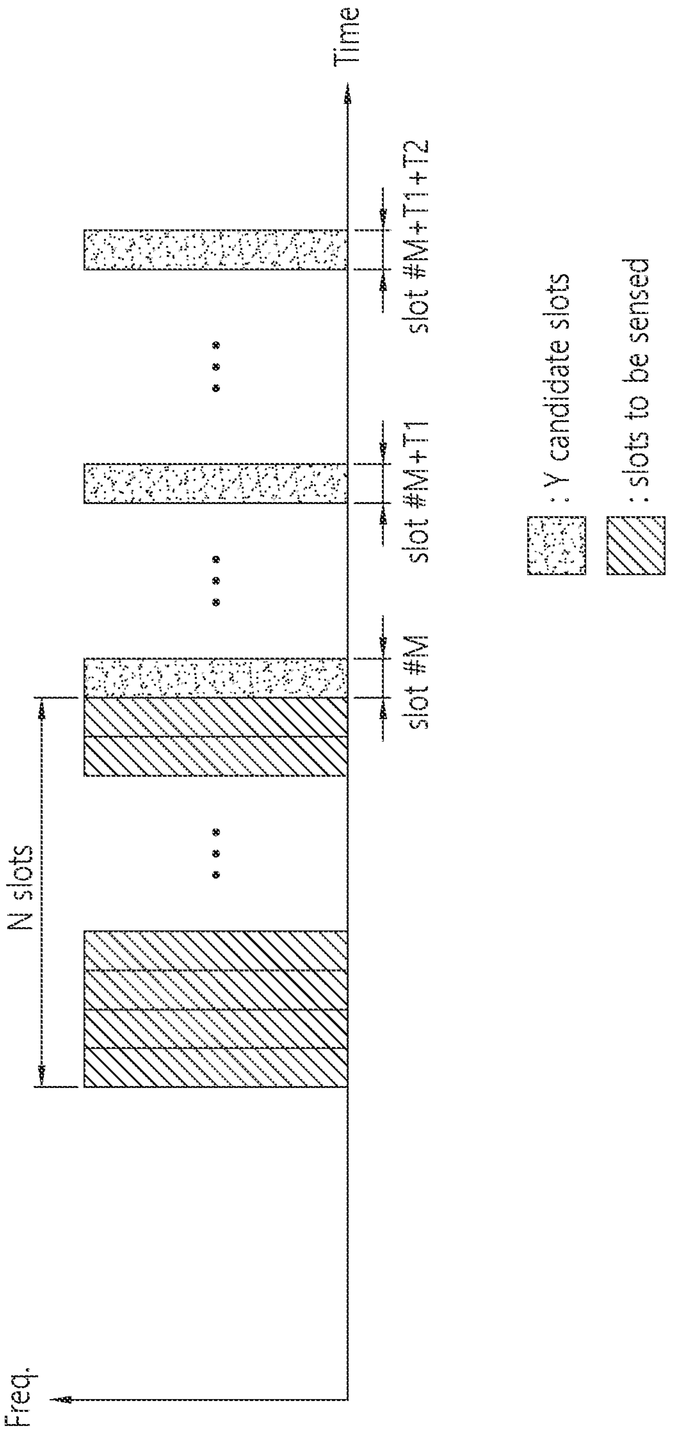
FIG. 11 shows a method for a UE to perform CPS, based on an embodiment of the present disclosure.

FIG. 11 shows a method for a UE to perform CPS, based on an embodiment of the present disclosure. The embodiment of FIG. 11 may be combined with various embodiments of the present disclosure.

In the embodiment of FIG. 11, it is assumed that Y candidate slots selected by the UE are the slot #M, the slot #(M+T1), and the slot #(M+T1+T2). In this case, slots in which the UE needs to perform sensing may be determined based on the first slot (i.e., slot #M) among Y candidate slots. For example, after determining the first slot among Y candidate slots as a reference slot, the UE may perform sensing for (previous) N slots from the reference slot.

Referring to FIG. 11, based on the first slot (i.e., slot #M) among Y candidate slots, the UE may perform sensing for N slots. For example, the UE may perform sensing for N slots before the slot #M, and the UE may select at least one SL resource from among Y candidate slots (i.e., slot #M, slot #(M+T1), and slot #(M+T1+T2)) based on a result of the sensing. For example, N may be configured or pre-configured for the UE. For example, a time gap for processing may exist between the last slot among the N slots and the slot #M.

In the present disclosure, partial sensing may include PBPS or CPS.

In the present disclosure, partial sensing may refer to partial sensing including the PBPS operation and/or the CPS operation.

In the present disclosure. REV may refer to resource re-evaluation, and PEC may refer to resource pre-emption checking.

Hereinafter, the “candidate resource/slot” refers to a resource selected by the UE, which has selected a resource selection window to perform partial sensing, to detect whether there is a resource collision within the resource selection window when transmission resource selection is triggered for the first time to transmit any packet. The “available resource/slot” may refer to a resource which is determined to be available for transmission and reported from the PHY layer to the MAC layer because no resource collision is detected among candidate resources based on the partial sensing. The “transmission resource/slot” may refer to a resource finally selected by the MAC layer for SL transmission among the reported resources.

When a UE A performing a power saving operation selects transmission resource(s) from a SL resource pool in order to perform SL communication, the UE A may receive Inter-UE Coordination (IUC) information used/considered for resource selection of the UE A from other UE(s), and the UE A may select transmission resource(s) by considering the IUC information.

Figure 12:
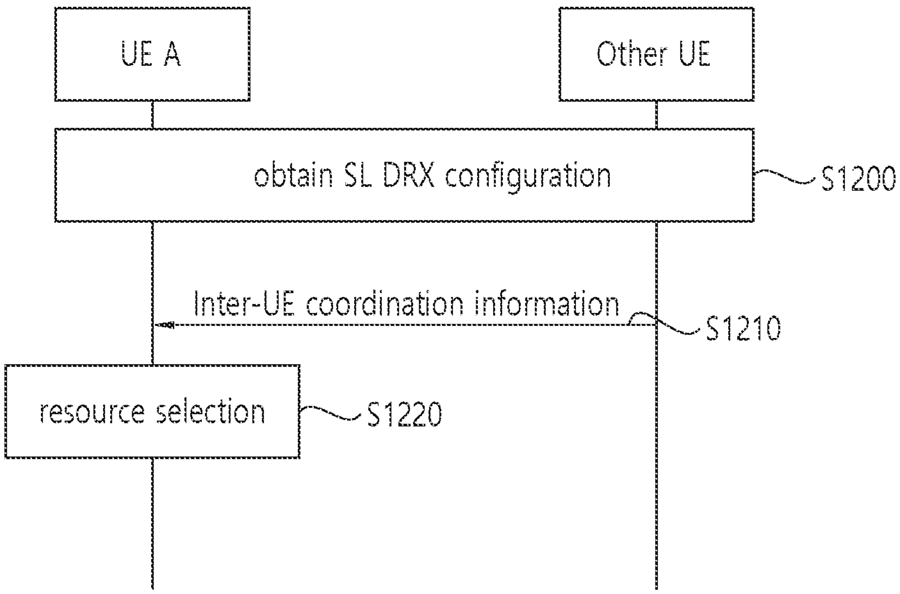
FIG. 12 shows a procedure in which a UE A performing a power saving operation selects transmission resource(s) from a SL resource pool in order to perform SL communication, based on an embodiment of the present disclosure.

FIG. 12 shows a procedure in which a UE A performing a power saving operation selects transmission resource(s) from a SL resource pool in order to perform SL communication, based on an embodiment of the present disclosure. The embodiment of FIG. 12 may be combined with various embodiments of the present disclosure.

Referring to FIG. 12, in step S1200, the UE A and other UE(s) may obtain SL discontinuous reception (DRX) configuration. For example, the other UE(s) may be a UE B receiving data transmitted through transmission resource(s) to be selected by the UE A. For example, the other UE(s) may be a UE C which is performing another SL communication with the UE A, separately from SL communication through the transmission resource(s). For example, the other UE(s) may be a UE D which is monitoring a SL communication channel such as PSCCH/PSSCH/PSFCH transmitted for SL communication between the UE A and the UE B and/or the UE C.

For example, the SL DRX configuration may include at least one of information related to a SL DRX timer, information related to a SL DRX slot offset, information related to a SL DRX start offset, and/or information related to a SL DRX cycle For example, the SL DRX timer may include at least one of a SL DRX onduration timer, a SL DRX inactivity timer, a SL DRX retransmission timer, and/or a SL DRX HARQ RTT timer. For example, the SL DRX onduration timer may be the duration at the beginning of an SL DRX cycle. For example, the SL DRX inactivity timer may be the duration after the first slot of SCI reception in which an SCI indicates a new SL transmission for the MAC entity. For example, the SL DRX retransmission timer may be the maximum duration until an SL retransmission is received. For example, the SL DRX HARQ RTT timer may be the minimum duration before an SL HARQ retransmission is expected by the MAC entity. For example, the SL DRX retransmission timer and the SL DRX HARQ RTT timer may be configured per sidelink process. For example, the SL DRX inactivity timer, SL DRX retransmission timer, and SL DRX HARQ RTT timer may not be applied to broadcast transmission. For example, the UE may start the SL DRX retransmission timer after the SL DRX HARQ RTT timer expires.

For example, the SL DRX slot offset may be a delay before the start of the SL DRX onduration timer. For example, the SL DRX start offset may be the slot where the SL DRX cycle starts.

For example, the running time of at least one of the SL DRX onduration timer, the SL DRX inactivity timer, and/or the SL DRX retransmission timer may be an active time. However, in various embodiments of the present disclosure, the active time is not limited to a time during which at least one of the SL DRX onduration timer, the SL DRX inactivity timer, and/or the SL DRX retransmission timer is running. For example, even if the SL DRX onduration timer, SL DRX inactivity timer, and SL DRX retransmission timer are not running, the RX UE may operate in an active time, and the RX UE may monitor a PSCCH from the TX UE.

In step S1210, the UE A may receive IUC information used/considered for resource selection of the UE A from the other UE(s). Alternatively, the UE A may not receive IUC information used/considered for resource selection of the UE A from the other UE(s). For example, the IUC information may include a preferred resource set and/or a non-preferred resource set.

In step S1220, the UE A may select transmission resource (s) by considering the IUC information. Based on various embodiments of the present disclosure, the UE A may perform the following operation based on reception of the IUC information or whether the IUC information is received.

1) In Case that the UE A (Re)Selects Transmission Resource (s) for Periodic Transmission A. If the UE A receives the IUC information that can be used to (re)select transmission resource(s), i. The UE A may not perform PPS for detecting resource collisions caused by predictable transmission of other UEs, and the UE A may perform only CPS for detecting resource collisions caused by unpredictable transmission of other UEs. Through this, the UE A may (re)select candidate/available/transmission resource(s) based on available sensing results such as the IUC information and the CPS result.

ii. The UE A may not perform CPS corresponding to short-term sensing, which is easy for other UEs to perform and to provide through IUC information, and the UE A may perform only PPS corresponding to long-term sensing, which is difficult for other UEs to perform and to provide through IUC information. Through this, the UE A may (re)select candidate/available/transmission resource(s) based on available sensing results such as the IUC information and the PPS result.

iii. For power saving, the UE A may not perform partial sensing such as PPS and CPS, and the UE A may (re)select candidate/available/transmission resource(s) based on the IUC information. For example, the UE A may randomly (re)select candidate/available/transmission resource(s) among resources within a packet delay budget (PDB) of a packet to be transmitted, among resources indicated/represented as preferred resources by the other UE(s) based on the TUC information. For example, the UE A may exclude resources indicated/represented by the other UE(s) as non-preferred resources or detected resources in the past/future, among resources indicated/represented as preferred resources by the other UE(s) based on the IUC information, from candidate/available/transmission resource(s).

iv. If the UE A performs PPS for transmission resource selection, and if the number of candidate resources for which a result of partial sensing or PPS is available is less than a specific threshold Ymin, iv.1. If the UE A receives IUC information available for the transmission resource selection, the UE A may (re)select candidate/available/transmission resource(s) based on the IUC information and candidate resources for which the result of partial sensing or PPS is available.

iv.2. If the UE A receives TUC information available for the transmission resource selection, the UE A may (re)select candidate/available/transmission resource(s) based on the IUC information.

iv.3. If the UE A does not receive TUC information available for the transmission resource selection, the UE A may randomly select resource(s) in the SL resource pool, or the UE A may randomly (re)select resource(s) in the SL resource pool or an exceptional resource pool based on a priority of a transmission packet.

iv.4. If the UE A does not receive IUC information available for the transmission resource selection, and if a priority value of a transmission packet is less than or equal to a specific threshold, the UE A may randomly (re)select resource(s) in the SL resource pool. On the other hand, if a priority value of a transmission packet is greater than a specific threshold, the UE A may randomly (re)select resource(s) in an exceptional resource pool, or the UE A may randomly (re)select resource(s) in another SL resource pool that allows random resource selection for transmission of a transmission packet having the priority value.

v. If the length of a resource selection window selected by the UE A for periodic transmission resource selection is less than a specific threshold T2_min, v.1. The UE A may (re)select resource(s) within a PDB required for a transmission packet, among transmittable resources related to the IUC information or preferred resources of the UE B, as candidate/available/transmission resource(s).

v.2. If there is no resource within the PDB required for the transmission packet among transmittable resources related to the IUC information or preferred resources of the UE B, the UE A may drop the transmission.

B. (Only) if the UE A does not receive the IUC information that can be used to (re)select transmission resource(s), the UE A may (re)select candidate/available/transmission resource(s) based on available sensing results such as the PPS and CPS results by performing partial sensing such as PPS and CPS.

2) In Case that the UE a (Re)Selects Transmission Resource (s) for Aperiodic Transmission A. If the UE A receives the IUC information that can be used to (re)select transmission resource(s), the UE A may not perform CPS for aperiodic transmission, and the UE A may (re)select candidate/available/transmission resource(s) based on the IUC information.

B. (Only) if the UE A does not receive the IUC information that can be used to (re)select transmission resource(s), i. The UE A may (re)select candidate/available/transmission resource(s) based on available sensing results such as the CPS result.

ii. If there is no available sensing result such as the CPS result or the number of available sensing results is less than a specific threshold, ii.1. The UE A may randomly select resource(s) in the SL resource pool, or the UE A may randomly (re)select resource (s) in the SL resource pool or an exceptional resource pool based on a priority of a transmission packet.

ii.2. If a priority value of a transmission packet is less than or equal to a specific threshold, the UE A may randomly (re)select resource(s) in the SL resource pool. If a priority value of a transmission packet is greater than a specific threshold, the UE A may randomly (re)select resource(s) in an exceptional resource pool, or the UE A may randomly (re)select resource(s) in another SL resource pool that allows random resource selection for transmission of a transmission packet having the priority value.

3) In Case that the UE a Reselects Resource(s) Based on REV and/or PEC for the Selected Resource(s)

A. If the UE A receives the IUC information that can be used to reselect transmission resource(s) based on REV and/or PEC, i. The UE A may not perform PPS for REV and/or PEC for detecting resource collisions caused by predictable transmission of other UEs, and the UE A may perform only CPS for REV and/or PEC for detecting resource collisions caused by unpredictable transmission of other UEs. Through this, the UE A may reselect candidate/available/transmission resource(s) based on available sensing results such as the TUC information and CPS results for the REV and/or PEC.

ii. The UE A may not perform CPS for REV and/or PEC corresponding to short-term sensing, which is easy for other UEs to perform and to provide through IUC information, and the UE A may perform only PPS for REV and/or PEC corresponding to long-term sensing, which is difficult for other UEs to perform and to provide through TUC information. Through this, the UE A may reselect candidate/available/transmission resource(s) based on available sensing results such as the IUC information and PPS results for the REV and/or PEC.

iii. For power saving, the UE A may not perform partial sensing such as PPS and CPS for REV and/or PEC, and the UE A may reselect candidate/available/transmission resource(s) based on the IUC information.

iv. If the UE A performs PPS for REV and/or PEC for reselection of transmission resource(s) based on REV and/or PEC, and if the number of candidate resources for which a result of partial sensing or PPS is available is less than a specific threshold Ymin, iv.1. If the UE A receives IUC information available for the transmission resource selection, the UE A may reselect candidate/available/transmission resource(s) based on the TUC information and candidate resources for which the result of partial sensing or PPS is available.

iv.2. If the UE A receives TUC information available for the transmission resource selection, the UE A may reselect candidate/available/transmission resource(s) based on the IUC information.

iv.3. If the UE A does not receive IUC information available for the transmission resource selection, the UE A may randomly select resource(s) in the SL resource pool, or the UE A may randomly reselect resource(s) in the SL resource pool or an exceptional resource pool based on a priority of a transmission packet.

iv.4. If the UE A does not receive IUC information available for the transmission resource selection, and if a priority value of a transmission packet is less than or equal to a specific threshold, the UE A may randomly reselect resource(s) in the SL resource pool. On the other hand, if a priority value of a transmission packet is greater than a specific threshold, the UE A may randomly reselect resource (s) in an exceptional resource pool, or the UE A may randomly reselect resource(s) in another SL resource pool that allows random resource selection for transmission of a transmission packet having the priority value.

v. If the length of a resource selection window selected by the UE A for periodic transmission resource reselection for REV and/or PEC is less than a specific threshold T2_min, v.1. The UE A may (re)select resource(s) within a PDB required for a transmission packet, among transmittable resources related to the IUC information or preferred resources of the UE B, as candidate/available/transmission resource(s).

v.2. If there is no resource within the PDB required for the transmission packet among transmittable resources related to the TUC information or preferred resources of the UE B, the UE A may drop the transmission.

B. (Only) if the UE A does not receive the IUC information that can be used to reselect transmission resource(s) based on REV and/or PEC, the UE A may perform partial sensing such as PPS and CPS for REV and/or PEC. Through this, the UE A may reselect candidate/available/transmission resource(s) based on available sensing results such as the PPS and CPS results.

Table 14 shows an example of SL channel busy ratio (CBR) and SL RSSI.

TABLE 14

| | |
|---|---|
| | SL CBR |
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n − a, n − 1], wherein a is equal to 100 or $100 \cdot 2^{\mu}$ slots, according to higher layer parameter timeWindowSize-CBR. |
| Applicable for | RRC_IDLE intra-frequency,<br>RRC_IDLE inter-frequency,<br>RRC_CONNECTED intra-frequency,<br>RRC_CONNECTED inter-frequency |
| | SL RSSI |
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the 2nd OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and |

TABLE 14-continued

| | |
|---|---|
| | 2, if receiver deversity is in use by the UE, the reported SL RSSI value shall not be lower than the corresponding SL RSSI of any of the individual receiver branches. |
| Applicable for | RRC_IDLE intra-frequency, RRC_IDLE inter-frequency, RRC_CONNECTED intra-frequency, RRC_CONNECTED inter-frequency |

Referring to Table 14, the slot index may be based on a physical slot index.

Table 15 shows an example of SL Channel Occupancy Ratio (CR).

TABLE 15

| | |
|---|---|
| Definition | Sideline Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b]. |
| Applicable for | RRC_IDLE intra-frequency, RRC_IDLE inter-frequency, RRC_CONNECTED intra-frequency, RRC_CONNECTED inter-frequency |

TABLE 16

| | |
|---|---|
| NOTE 1: | a is a positive integer and b is 0 or a positive integer; a and b are determined by UE implementation with a + b + 1 = 1000 or 1000 · $2^{\mu}$ slots, according to higher layer parameter sl-TimeWindowSizeCR, b < (a + b + 1)/2, and n + b shall not exceed the last transmission opportunity of the grant for the current transmission. |
| NOTE 2: | SL CR is evaluated for each (re)transmission. |
| NOTE 3: | In evaluating SL CR, the UE shall assume the transmission parameter used at slot n is reused according to the existing grant(s) in slot [n + 1, n + b] without packet dropping. |
| NOTE 4: | The slot index is based on physical slot index. |
| NOTE 5: | SL CR can be computed per priority level |
| NOTE 6: | A resource is considered granted if it is a member of a selected sidelink grant as defined in TS 38.321 [7]. |

4) In case that the UE A measures a channel busy ratio (CBR) for a transmission channel A. If the UE A receives the IUC information that can be used for CBR measurement, i. The UE A may calculate a CBR measurement value based on the IUC information.

ii. The UE A may calculate a final CBR measurement value based on the IUC information and a CBR measurement value measured by the UE A.

iii. The UE A may calculate a final CBR measurement value based on the IUC information and a CBR value configured to a specific configuration value.

iv. The UE A may calculate a final CBR measurement value based on the IUC information, the CBR value configured to the specific configuration value, and the CBR measurement value measured by the UE A.

v. The UE A may calculate a final CBR measurement value based on the IUC information and the CBR measurement value measured by the UE A (only) if the number of measurement values for CBR measurement is insufficient.

vi. The UE A may calculate a final CBR measurement value based on the IUC information and the CBR value configured to the specific configuration value (only) if the number of measurement values for CBR measurement is insufficient.

vii. The UE A may calculate a final CBR measurement value based on the IUC information, the CBR value configured to the specific configuration value, and the CBR measurement value measured by the UE A (only) if the number of measurement values for CBR measurement is insufficient.

B. (Only) if the UE A does not receive the TUC information that can be used for CBR measurement, i. The UE A may calculate a final CBR measurement value based on a CBR measurement value measured by the UE A.

ii. The UE A may calculate a final CBR measurement value based on a CBR value configured to a specific configuration value.

iii. The UE A may calculate a final CBR measurement value based on the CBR value configured to the specific configuration value and the CBR measurement value measured by the UE A.

iv. The UE A may calculate a final CBR measurement value based on the CBR measurement value measured by the UE A (only) if the number of measurement values for CBR measurement is insufficient.

v. The UE A may calculate a final CBR measurement value based on the CBR value configured to the specific configuration value (only) if the number of measurement values for CBR measurement is insufficient.

vi. The UE A may calculate a final CBR measurement value based on the CBR value configured to the specific configuration value and the CBR measurement value measured by the UE A (only) if the number of measurement values for CBR measurement is insufficient.

5) In Case that the UE A Performs a SL DRX Operation

A. If the UE A receives the IUC information that can be used to (re)select transmission resource(s), i. The UE A may perform partial sensing such as PPS and/or CPS as described above in steps 1), 2), and 3) only in a SL DRX onduration and/or an active duration of the UE A. and the UE A may utilize the IUC information as partial sensing information for the corresponding duration in a SL DRX off duration and/or an inactive duration of the UE A. For example, the UE A may (re)select candidate/available/transmission resource(s) for a packet to be transmitted, based on the TUC information and the result of the partial sensing performed by the UE A in the onduration and/or the active duration.

B. (Only) if the UE A does not receive the IUC information that can be used to (re)select transmission resource(s), i. The UE A may perform a partial sensing operation required for periodic/aperiodic packet transmission, in a SL DRX onduration and/or an active duration and a SL DRX off duration and/or an inactive duration, and the UE A may (re)select candidate/available/transmission resource(s) for a packet to be transmitted based on the result of the partial sensing.

6) In Case that the UE B Performs a SL DRX Operation

A. If the UE A receives the IUC information that can be used to (re)select transmission resource(s), i. The UE A may (re)select the number of candidate/available/transmission resources greater than or equal to a specific threshold, based on the result of the partial sensing performed by the UE A, only within a SL DRX onduration and/or an active onduration of the UE B at the time of selecting transmission resource(s). The UE A may (re)select remaining candidate/available/transmission resources, based on the IUC information, within an extended active duration of the UE B that can be extended by the UE B after the above duration, wherein the number of remaining candidate/available/transmission resources is equal to a value obtained by subtracting the number of candidate/available/transmission resources selected within the SL DRX onduration and/or the active duration of the UE B from the total number of minimum candidate/available/transmission resources required for successful packet transmission. For example, the SL DRX onduration and/or the active duration of the UE B at the time of selecting transmission resource(s) may be referred to as a current active time, and the extended active duration of the UE B that can be extended by the UE B may be referred to as a future active time.

B. (Only) if the UE A does not receive the TUC information that can be used to (re)select transmission resource (s), i. The UE A may (re)select the number of candidate/available/transmission resources greater than or equal to a specific threshold, based only on the result of the partial sensing performed by the UE A, only within a SL DRX onduration and/or an active onduration of the UE B at the time of selecting transmission resource(s). The UE A may (re)select remaining candidate/available/transmission resources, within an extended active duration of the UE B that can be extended by the UE B after the above duration, wherein the number of remaining candidate/available/transmission resources is equal to a value obtained by subtracting the number of candidate/available/transmission resources selected within the SL DRX onduration and/or the active duration of the UE B from the total number of minimum candidate/available/transmission resources required for successful packet transmission.

Based on various embodiments of the present disclosure, the UE may select a resource allocation scheme based on inter-UE coordination information. Through this, there is an effect of avoiding transmission collision as much as possible by excluding resources according to transmission collision. Specifically, for example, even if resource selection based on partial sensing is configured for the UE A, the UE A may skip performing the partial sensing for power saving. In this case, if the UE A receives IUC information including information related to a preferred resource set, the UE A not having a sensing result may select transmission resource(s) from resources belonging to the preferred resource set included in the IUC information. Through this, the power saving gain of the UE A can be maximized, and resource collision can be minimized, and reliability of SL communication can be improved.

For example, whether the rule is applied and/or the parameter value related to the proposed method/rule may be configured/allowed specifically (or differently or independently) for a service type. For example, whether the rule is applied and/or the parameter value related to the proposed method/rule may be configured/allowed specifically (or differently or independently) for a (LCH or service) priority. For example, whether the rule is applied and/or the parameter value related to the proposed method/rule may be configured/allowed specifically (or differently or independently) for a QoS requirement (e.g., latency, reliability, minimum communication range). For example, whether the rule is applied and/or the parameter value related to the proposed method/rule may be configured/allowed specifically (or differently or independently) for a PQI parameter. For example, whether the rule is applied and/or the parameter value related to the proposed method/rule may be configured/allowed specifically (or differently or independently) for HARQ feedback enabled LCH/MAC PDU (transmission). For example, whether the rule is applied and/or the parameter value related to the proposed method/rule may be configured/allowed specifically (or differently or independently) for HARQ feedback disabled LCH/MAC PDU (transmission). For example, whether the rule is applied and/or the parameter value related to the proposed method/rule may be configured/allowed specifically (or differently or independently) for a CBR measurement value of a resource pool. For example, whether the rule is applied and/or the parameter value related to the proposed method/rule may be configured/allowed specifically (or differently or independently) for a SL cast type (e.g., unicast, groupcast, broadcast). For example, whether the rule is applied and/or the parameter value related to the proposed method/rule may be configured/allowed specifically (or differently or independently) for a SL groupcast HARQ feedback option (e.g., NACK only feedback, ACK/NACK feedback, NACK only feedback based on TX-RX distance). For example, whether the rule is applied and/or the parameter value related to the proposed method/rule may be configured/allowed specifically (or differently or independently) for a SL mode 1 CG type (e.g., SL CG type 1 or SL CG type 2). For example, whether the rule is applied and/or the parameter value related to the proposed method/rule may be configured/allowed specifically (or differently or independently) for a SL mode type (e.g., mode 1 or mode 2). For example, whether the rule is applied and/or the parameter value related to the proposed method/rule may be configured/allowed specifically (or differently or independently) for a resource pool. For example, whether the rule is applied and/or the parameter value related to the proposed method/rule may be configured/allowed specifically (or differently or independently) for whether a PSFCH resource is configured in a resource pool. For example, whether the rule is applied and/or the parameter value related to the proposed method/rule may be configured/allowed specifically (or differently or independently) for a source (L2) ID. For example, whether the rule is applied and/or the parameter value related to the proposed method/rule may be configured/allowed specifically (or differently or independently) for a destination (L2) ID. For example, whether the rule is applied and/or the parameter value related to the proposed method/rule may be configured/allowed specifically (or differently or independently) for a PC5 RRC connection link. For example, whether the rule is applied and/or the parameter value related to the proposed method/rule may be configured/allowed specifically (or differently or independently) for a SL link. For example, whether the rule is applied and/or the parameter value related to the proposed method/rule may be configured/allowed specifically (or differently or independently) for a connection state (with a base station)(e.g., RRC CONNECTED state, IDLE state, INACTIVE state). For example, whether the rule is applied and/or the parameter value related to the proposed method/rule may be configured/allowed specifically (or differently or independently) for a SL HARQ process (ID). For example, whether the rule is applied and/or the parameter value related to the proposed method/rule may be configured/allowed specifically (or differently or independently) for whether to perform SL DRX operation (of TX UE or RX UE). For example, whether the rule is applied and/or the parameter value related to the proposed method/rule may be configured/allowed specifically (or differently or independently) for whether a UE is a power saving (TX or RX) UE. For example, whether the rule is applied and/or the parameter value related to the proposed method/rule may be configured/allowed specifically (or differently or independently) for a case in which PSFCH TX and PSFCH RX (and/or a plurality of PSFCH TXs (exceeding UE capability)) overlap (and/or a case in which PSFCH TX (and/or PSFCH RX) is skipped)(from a specific UE perspective). For example, whether the rule is applied and/or the parameter value related to the proposed method/rule may be configured/allowed specifically (or differently or independently) for a case in which the RX UE actually (successfully) receives PSCCH (and/or PSSCH) (re)transmission from the TX UE.

For example, in the present disclosure, the term "configured/configuration (or designated/designation)" can be extended/interpreted to/as that the base station informs the UE through a pre-defined (physical layer or higher layer) channel/signal (e.g., SIB, RRC, MAC CE) (and/or being provided through pre-configuration and/or that the UE informs other UEs through a pre-defined (physical layer or higher layer) channel/signal (e.g., SL MAC CE, PC5 RRC)).

For example, in the present disclosure, the term "PSFCH" can be extended/interpreted to/as (NR or LTE) PSSCH (and/or (NR or LTE) PSCCH) (and/or (NR or LTE) SL SSB (and/or UL channel/signal)). In addition, the proposed methods of the present disclosure can be used in combination with each other (as a new type of manner).

For example, in the present disclosure, the specific threshold may refer to a threshold pre-defined or (pre-)configured by a higher layer (including an application layer) of the network, the base station, or the UE. For example, in the present disclosure, the specific configured value may refer to a value pre-defined or (pre-)configured by a higher layer (including an application layer) of the network, the base station, or the UE. For example, the operation configured by the network/base station may refer to that the base station (pre-)configures to the UE through higher layer RRC signaling or the base station configures/signals to the UE through MAC CE or the base station signals to the UE through DCI.

Figure 13:
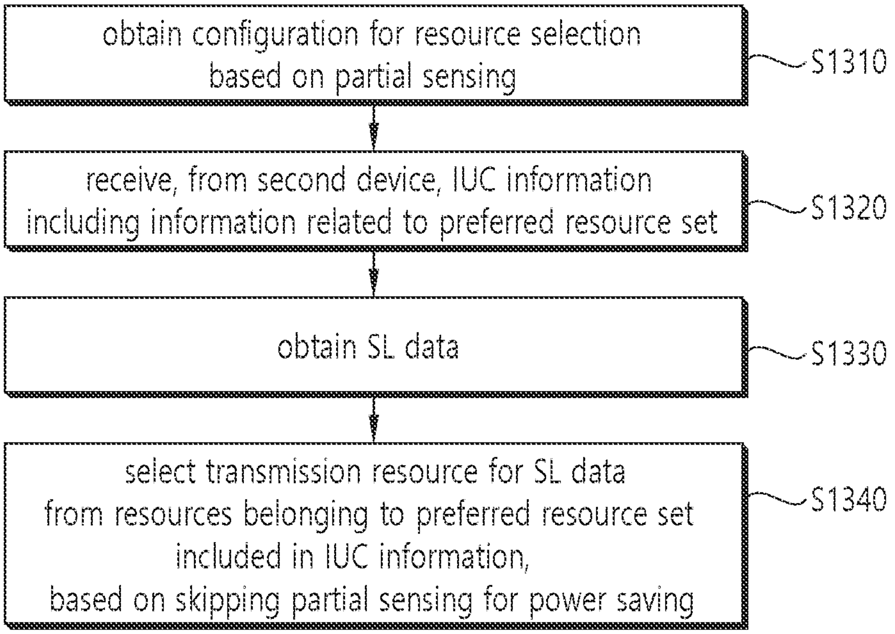
FIG. 13 shows a method for performing wireless communication by a first device, based on an embodiment of the present disclosure.

FIG. 13 shows a method for performing wireless communication by a first device, based on an embodiment of the present disclosure. The embodiment of FIG. 13 may be combined with various embodiments of the present disclosure.

Referring to FIG. 13, in step S1310, the first device may obtain a configuration for resource selection based on partial sensing. For example, the partial sensing may include periodic-based partial sensing (PBPS) or contiguous partial sensing (CPS). In step S1320, the first device may receive, from a second device, inter-UE coordination (IUC) information including information related to a preferred resource set. In step S1330, the first device may obtain sidelink (SL) data. In step S1340, the first device may select a transmission resource for the SL data from resources belonging to the preferred resource set included in the IUC information, based on skipping the partial sensing for power saving. For example, the SL data may be SL-SCH data.

For example, the first device may not have its own sensing result based on skipping the partial sensing for the power saving.

For example, the transmission resource for the SL data may be randomly selected from the resources belonging to the preferred resource set based on a packet delay budget (PDB) of available SL data. Additionally, for example, the first device may obtain a medium access control (MAC) protocol data unit (PDU) based on the available SL data.

For example, based on that a number of available candidate resources selected based on the partial sensing is less than a threshold, the transmission resource for the SL data may be selected based on the available candidate resources and the IUC information.

For example, based on that a number of available candidate resources selected based on the partial sensing is less than a threshold, the transmission resource for the SL data may be selected based on the TUC information.

For example, based on the reception of the IUC information including the information related to the preferred resource set, the first device may not be allowed to perform the partial sensing.

Additionally, for example, the first device may perform CBR measurement for obtaining a channel busy ratio (CBR) value based on the IUC information. For example, based on that a number of measurement values for the CBR measurement is less than or equal to a threshold, the CBR value may be obtained based on the TUC information and a CBR measurement value measured by the first device. For example, based on that a number of measurement values for the CBR measurement is less than or equal to a threshold, the CBR value may be obtained based on the IUC information and a CBR value configured for the first device.

Additionally, for example, the first device may obtain a SL discontinuous reception (DRX) configuration including information related to a timer for an active time. For example, outside of the active time, the transmission resource for the SL data may be selected based on the IUC information. For example, within the active time, the transmission resource for the SL data may be selected based on the IUC information and a result of the partial sensing.

Additionally, for example, the first device may obtain information related to a minimum number of resources for SL transmission. For example, N resources may be selected by the first device within a current active time based on a result of the partial sensing, and M resources may be selected by the first device within a future active time based on the IUC information, and a sum of N and M may be equal to the minimum number.

The proposed method can be applied to the device(s) based on various embodiments of the present disclosure. First, the processor 102 of the first device 100 may obtain a configuration for resource selection based on partial sensing. For example, the partial sensing may include periodic-based partial sensing (PBPS) or contiguous partial sensing (CPS). In addition, the processor 102 of the first device 100 may control the transceiver 106 to receive, from a second device, inter-UE coordination (IUC) information including information related to a preferred resource set. In addition, the processor 102 of the first device 100 may obtain sidelink (SL) data. In addition, the processor 102 of the first device 100 may select a transmission resource for the SL data from resources belonging to the preferred resource set included in the IUC information, based on skipping the partial sensing for power saving.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: obtain a configuration for resource selection based on partial sensing, wherein the partial sensing includes periodic-based partial sensing (PBPS) or contiguous partial sensing (CPS); control the one or more transceivers to receive, from a second device, inter-UE coordination (IUC) information including information related to a preferred resource set; obtain sidelink (SL) data and select a transmission resource for the SL data from resources belonging to the preferred resource set included in the IUC information, based on skipping the partial sensing for power saving.

Based on an embodiment of the present disclosure, a processing device adapted to control a first device may be provided. For example, the processing device may comprise: one or more processors; and one or more memories operably connected to the one or more processors and storing instructions. For example, the one or more processors may execute the instructions to: obtain a configuration for resource selection based on partial sensing, wherein the partial sensing includes periodic-based partial sensing (PBPS) or contiguous partial sensing (CPS): receive, from a second device, inter-UE coordination (IUC) information including information related to a preferred resource set; obtain sidelink (SL) data; and select a transmission resource for the SL data from resources belonging to the preferred resource set included in the IUC information, based on skipping the partial sensing for power saving.

Based on an embodiment of the present disclosure, a non-transitory computer-readable storage medium storing instructions may be provided. For example, the instructions, when executed, may cause a first device to: obtain a configuration for resource selection based on partial sensing, wherein the partial sensing includes periodic-based partial sensing (PBPS) or contiguous partial sensing (CPS): receive, from a second device, inter-UE coordination (IUC) information including information related to a preferred resource set; obtain sidelink (SL) data; and select a transmission resource for the SL data from resources belonging to the preferred resource set included in the IUC information, based on skipping the partial sensing for power saving.

Figure 14:
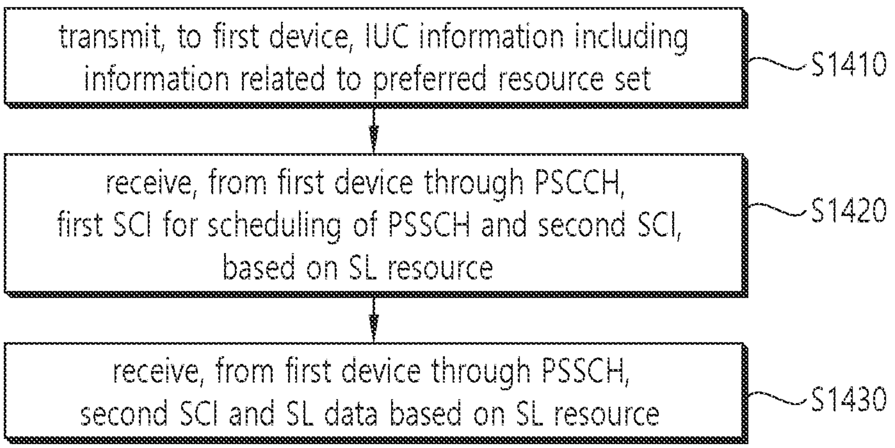
FIG. 14 shows a method for performing wireless communication by a second device, based on an embodiment of the present disclosure.

FIG. 14 shows a method for performing wireless communication by a second device, based on an embodiment of the present disclosure. The embodiment of FIG. 14 may be combined with various embodiments of the present disclosure.

Referring to FIG. 14, in step S1410, the second device may transmit, to a first device, inter-UE coordination (IUC) information including information related to a preferred resource set. In step S1420, the second device may receive, from the first device through a physical sidelink control channel (PSCCH), first sidelink control information (SCI) for scheduling of a physical sidelink shared channel (PSSCH) and second SCI, based on a sidelink (SL) resource. In step S1430, the second device may receive, from the first device through the PSSCH, the second SCI and SL data based on the SL resource. For example, based on that partial sensing is skipped by the first device for power saving, the SL resource may be selected from resources belonging to the preferred resource set included in the IUC information.

The proposed method can be applied to the device(s) based on various embodiments of the present disclosure. First, the processor 202 of the second device 200 may control the transceiver 206 to transmit, to a first device, inter-UE coordination (IUC) information including information related to a preferred resource set. In addition, the processor 202 of the second device 200 may control the transceiver 206 to receive, from the first device through a physical sidelink control channel (PSCCH), first sidelink control information (SCI) for scheduling of a physical sidelink shared channel (PSSCH) and second SCI, based on a sidelink (SL) resource. In addition, the processor 202 of the second device 200 may control the transceiver 206 to receive, from the first device through the PSSCH, the second SCI and SL data based on the SL resource. For example, based on that partial sensing is skipped by the first device for power saving, the SL resource may be selected from resources belonging to the preferred resource set included in the IUC information. For example, the SL data may be SL-SCH data.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: control the one or more transceivers to transmit, to a first device, inter-UE coordination (IUC) information including information related to a preferred resource set; control the one or more transceivers to receive, from the first device through a physical sidelink control channel (PSCCH), first sidelink control information (SCI) for scheduling of a physical sidelink shared channel (PSSCH) and second SCI, based on a sidelink (SL) resource; and control the one or more transceivers to receive, from the first device through the PSSCH, the second SCI and SL data based on the SL resource. For example, based on that partial sensing is skipped by the first device for power saving, the SL resource may be selected from resources belonging to the preferred resource set included in the IUC information.

Based on an embodiment of the present disclosure, a processing device adapted to control a second device may be provided. For example, the processing device may comprise: one or more processors, and one or more memories operably connected to the one or more processors and storing instructions. For example, the one or more processors may execute the instructions to: transmit, to a first device, inter-UE coordination (IUC) information including information related to a preferred resource set; receive, from the first device through a physical sidelink control channel (PSCCH), first sidelink control information (SCI) for scheduling of a physical sidelink shared channel (PSSCH) and second SCI, based on a sidelink (SL) resource; and receive, from the first device through the PSSCH, the second SCI and SL data based on the SL resource. For example, based on that partial sensing is skipped by the first device for power saving, the SL resource may be selected from resources belonging to the preferred resource set included in the IUC information.

Based on an embodiment of the present disclosure, a non-transitory computer-readable storage medium storing instructions may be provided. For example, the instructions, when executed, may cause a second device to: transmit, to a first device, inter-UE coordination (IUC) information including information related to a preferred resource set: receive, from the first device through a physical sidelink control channel (PSCCH), first sidelink control information (SCI) for scheduling of a physical sidelink shared channel (PSSCH) and second SCI, based on a sidelink (SL) resource; and receive, from the first device through the PSSCH, the second SCI and SL data based on the SL resource. For example, based on that partial sensing is skipped by the first device for power saving, the SL resource may be selected from resources belonging to the preferred resource set included in the TUC information.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
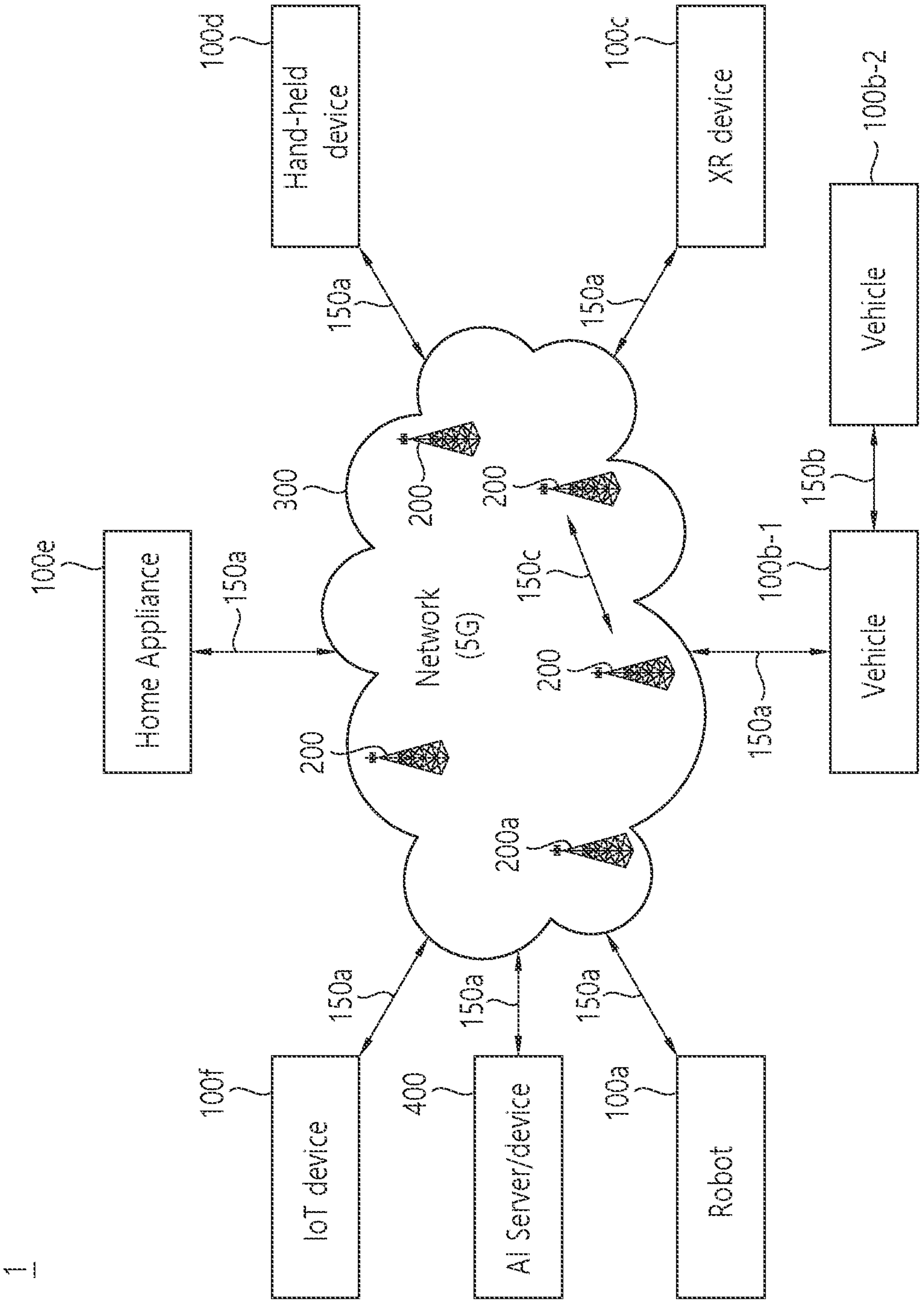
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE. NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
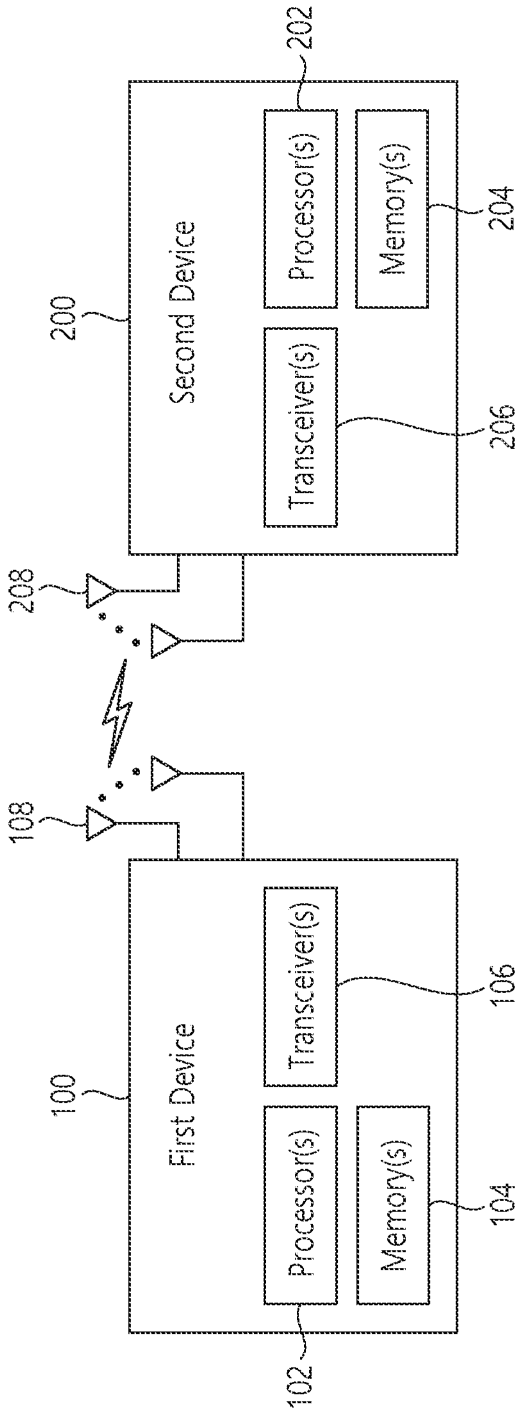
FIG. 16 shows wireless devices, based on an embodiment of the present disclosure.

FIG. 16 shows wireless devices, based on an embodiment of the present disclosure. The embodiment of FIG. 16 may be combined with various embodiments of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC. PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
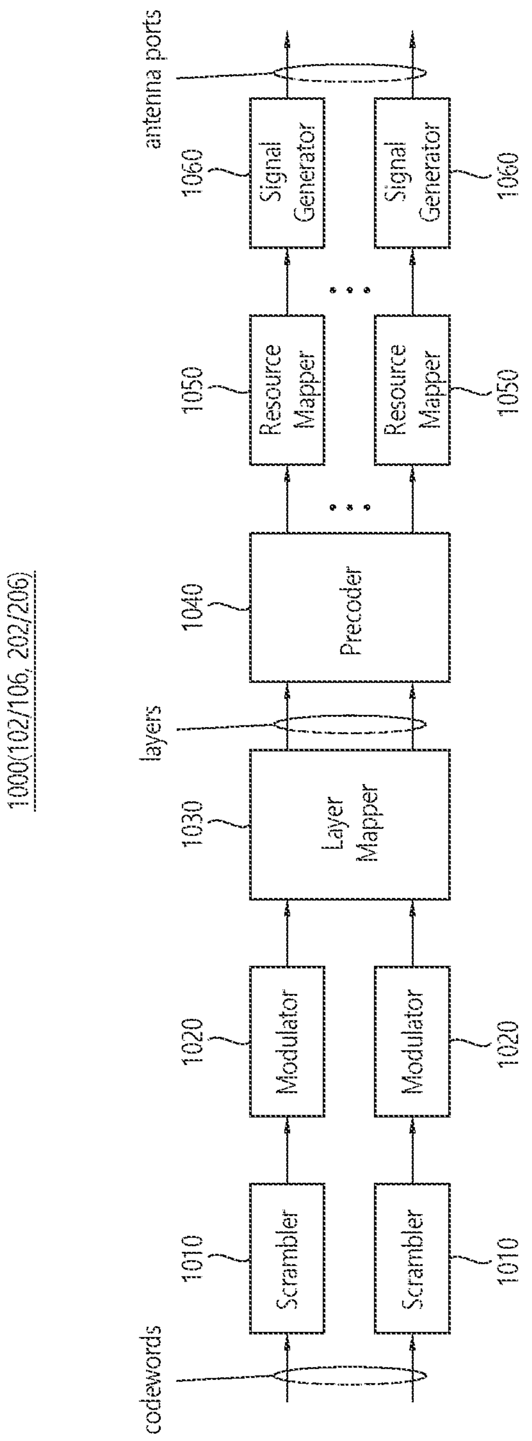
FIG. 17 shows a signal process circuit for a transmission signal, based on an embodiment of the present disclosure.

FIG. 17 shows a signal process circuit for a transmission signal, based on an embodiment of the present disclosure. The embodiment of FIG. 17 may be combined with various embodiments of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein. N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
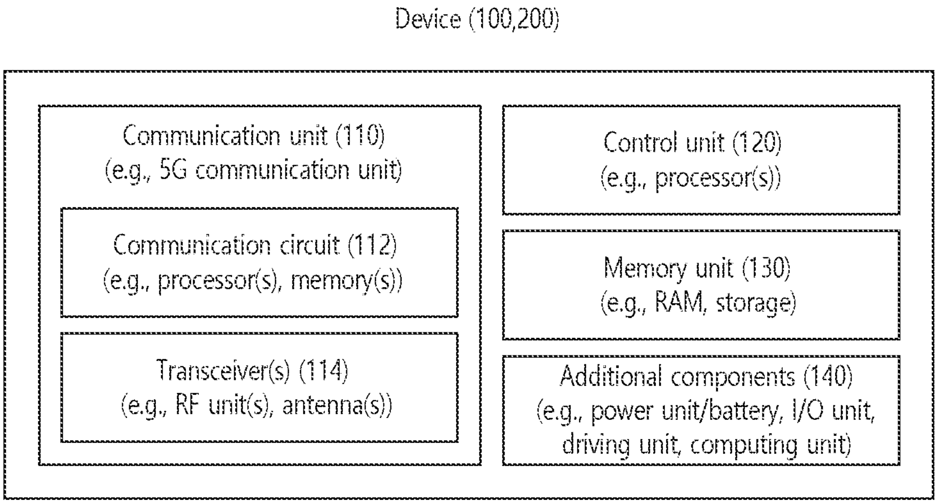
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15). The embodiment of FIG. 18 may be combined with various embodiments of the present disclosure.

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
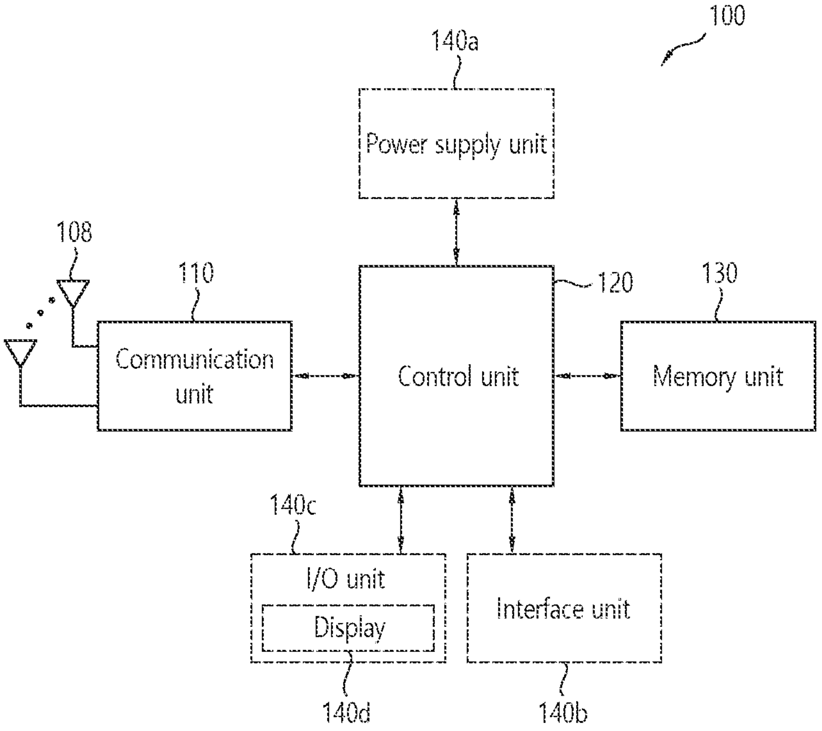
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 19 may be combined with various embodiments of the present disclosure.

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 10 to other external devices. The interface unit 140*b* may include various ports (e.g., an audio I/O port and a video 110 port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 20:
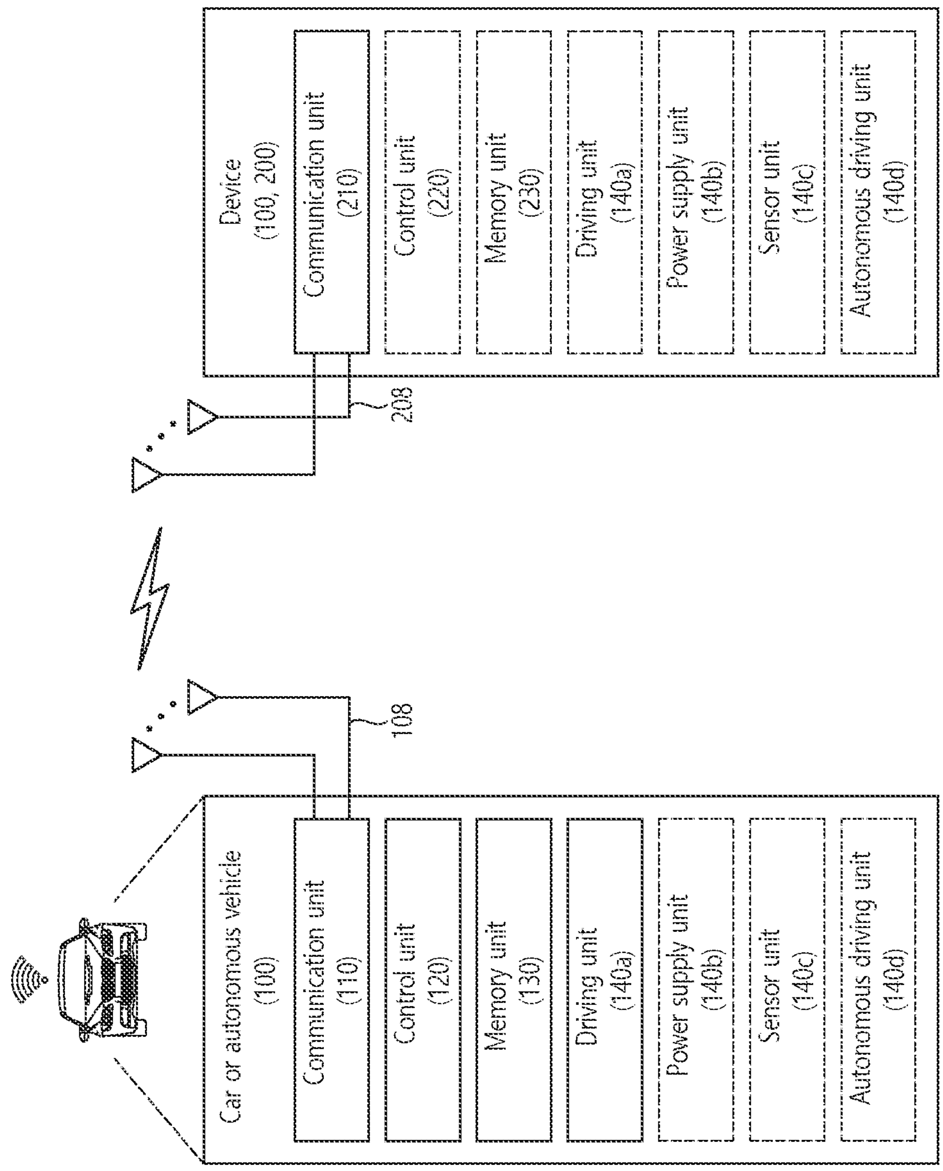
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 20 may be combined with various embodiments of the present disclosure.

Referring to FIG. 20, a vehicle or autonomous vehicle 10 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as apart of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

a first user equipment (UE) receiving, from a second UE, inter-UE coordination (IUC) information including information related to a preferred resource set;

the first UE obtaining inter-UE data;

the first UE obtaining information related to a minimum number of resources for inter-UE transmission; and the first UE selecting transmission resources for the inter-UE data from resources belonging to the preferred resource set included in the IUC information, based on skipping partial sensing for power saving, wherein the partial sensing includes periodic-based partial sensing (PBPS) or contiguous partial sensing (CPS), wherein N resources among the transmission resources are selected by the first UE within a current active time based on a result of the partial sensing, wherein M resources among the transmission resources are selected by the first UE within a future active time based on the IUC information, and wherein a sum of N and M is equal to the minimum number.

2. The method of claim 1, wherein the first UE does not have its own sensing result based on skipping the partial sensing for the power saving.

3. The method of claim 1, wherein the transmission resources for the inter-UE data are randomly selected from the resources belonging to the preferred resource set based on a packet delay budget (PDB) of available inter-UE data.

4. The method of claim 3, further comprising:

the first UE obtaining a medium access control (MAC) protocol data unit (PDU) based on the available inter-UE data.

5. The method of claim 1, wherein, based on the reception of the IUC information including the information related to the preferred resource set, the first UE is not allowed to perform the partial sensing.

6. The method of claim 1, further comprising:

the first UE performing channel busy ratio (CBR) measurement for obtaining a CBR value based on the IUC information.

7. The method of claim 6, wherein, based on that a number of measurement values for the CBR measurement is less than or equal to a threshold, the CBR value is obtained based on the IUC information and a CBR measurement value measured by the first UE.

8. The method of claim 6, wherein, based on that a number of measurement values for the CBR measurement is less than or equal to a threshold, the CBR value is obtained based on the IUC information and a CBR value configured for the first UE.

9. The method of claim 1, further comprising:

the first UE obtaining an inter-UE discontinuous reception (DRX) configuration including information related to a timer for an active time, wherein, outside of the active time, the transmission resources for the inter-UE data are selected based on the IUC information.

10. A first user equipment (UE) comprising:

one or more processors;

one or more transceivers; and one or more memories connected to the one or more processors and storing instructions, wherein the instructions, based on being executed by the one or more processors, cause the first UE to:

receive, from a second UE, inter-UE coordination (IUC) information including information related to a preferred resource set;

obtain inter-UE data;

obtain information related to a minimum number of resources for inter-UE transmission; and select transmission resources for the inter-UE data from resources belonging to the preferred resource set included in the IUC information, based on skipping partial sensing for power saving, wherein the partial sensing includes periodic-based partial sensing (PBPS) or contiguous partial sensing (CPS), wherein N resources among the transmission resources are selected by the first UE within a current active time based on a result of the partial sensing, wherein M resources among the transmission resources are selected by the first UE within a future active time based on the IUC information, and wherein a sum of N and M is equal to the minimum number.

11. A processing device adapted to control a first user equipment (UE), the processing device comprising:

one or more processors; and one or more memories connected to the one or more processors and storing instructions, wherein the instructions, based on being executed by the one or more processors, cause the first UE to:

receive, from a second UE, inter-UE coordination (IUC) information including information related to a preferred resource set;

obtain inter-UE data;

obtain information related to a minimum number of resources for inter-UE transmission; and select transmission resources for the inter-UE data from resources belonging to the preferred resource set included in the IUC information, based on skipping partial sensing for power saving, wherein the partial sensing includes periodic-based partial sensing (PBPS) or contiguous partial sensing (CPS), wherein N resources among the transmission resources are selected by the first UE within a current active time based on a result of the partial sensing, wherein M resources among the transmission resources are selected by the first UE within a future active time based on the IUC information, and wherein a sum of N and M is equal to the minimum number.

* * * * *